United States Patent
Line et al.

(10) Patent No.: US 10,106,068 B2
(45) Date of Patent: Oct. 23, 2018

(54) MODULAR HEAD RESTRAINT STRUCTURE AND STYLING ENABLEMENT FEATURES

(71) Applicant: Ford Global Technologies, LLC, Dearborn, MI (US)

(72) Inventors: Johnathan Andrew Line, Northville, MI (US); Marcos Silva Kondrad, Macomb Township, MI (US); Kevin Wayne Preuss, Berkley, MI (US); David Frederick Lyons, New Haven, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 15/398,855

(22) Filed: Jan. 5, 2017

(65) Prior Publication Data

US 2018/0186259 A1 Jul. 5, 2018

(51) Int. Cl.
| | |
|---|---|
| *A47C 1/10* | (2006.01) |
| *A47C 7/36* | (2006.01) |
| *A61G 15/00* | (2006.01) |
| *B60R 22/28* | (2006.01) |
| *B60N 2/882* | (2018.01) |
| *B60N 2/30* | (2006.01) |
| *B60N 2/20* | (2006.01) |
| *B60N 2/68* | (2006.01) |
| *B60N 2/885* | (2018.01) |

(52) U.S. Cl.
CPC ............... *B60N 2/882* (2018.02); *B60N 2/20* (2013.01); *B60N 2/302* (2013.01); *B60N 2/68* (2013.01); *B60N 2/885* (2018.02)

(58) Field of Classification Search
CPC .......... B60N 2/882; B60N 2/885; B60N 2/20; B60N 2/302; B60N 2/4879; B60N 2/4882; B60N 2/68; B60N 2/80; B60N 2/803; B60N 2/806; B60N 2/879; B60N 2/891; B60N 2/894
USPC ......................................................... 297/391
See application file for complete search history.

(56) References Cited

U.S. PATENT DOCUMENTS

| | | | |
|---|---|---|---|
| 5,700,057 A | 12/1997 | De Filippo | |
| 5,934,749 A * | 8/1999 | Pond ................... | B60N 2/4805 297/188.04 |
| 6,183,045 B1 * | 2/2001 | Marfilius ............... | B60N 2/803 297/391 |
| 6,305,713 B1 | 10/2001 | Pywell et al. | |

(Continued)

*Primary Examiner* — Mark R Wendell
(74) *Attorney, Agent, or Firm* — Vichit Chea; Price Heneveld LLP

(57) ABSTRACT

A headrest assembly for a vehicle seat includes a front panel with a base portion and a support portion. A rear panel includes a base portion and a support portion. A support member includes first and second legs that are interconnected by an upper cross member. First and second support wings are coupled to the first and second legs of the support member and outwardly extend therefrom. The base portion of the front panel couples to a front side of the first and second support wings. The base portion of the rear panel couples to a rear side of the first and second support wings. The support wings are overmolded to the support member along with one or more attachment features to interconnect the front and rear panels to one another around the support member.

17 Claims, 28 Drawing Sheets

(56) References Cited

U.S. PATENT DOCUMENTS

| | | | |
|---|---|---|---|
| 6,305,749 B1 * | 10/2001 | O'Connor | A47C 7/383 |
| | | | 297/397 |
| 6,631,956 B2 | 10/2003 | Mauro et al. | |
| 7,237,842 B2 * | 7/2007 | Schmuda von Trzebiatowski | ...... |
| | | | B60N 2/885 |
| | | | 297/391 |
| 7,560,060 B1 | 7/2009 | Dehart | |
| 7,625,048 B2 | 12/2009 | Rouhana et al. | |
| 8,342,602 B2 | 1/2013 | Bonne | |
| 9,027,991 B2 | 3/2015 | Ishida et al. | |
| 9,254,767 B1 | 2/2016 | Tuman, II et al. | |
| 2007/0057547 A1 * | 3/2007 | Hartenstine | B60N 2/2806 |
| | | | 297/256.13 |
| 2010/0187879 A1 * | 7/2010 | Brandl | B60N 2/2851 |
| | | | 297/250.1 |
| 2014/0145489 A1 * | 5/2014 | Wang | B60N 2/4814 |
| | | | 297/410 |
| 2015/0210191 A1 * | 7/2015 | Mizobata | B60N 2/888 |
| | | | 297/410 |
| 2015/0298372 A1 * | 10/2015 | Bielsa | B60N 2/80 |
| | | | 297/391 |
| 2017/0151894 A1 * | 6/2017 | McRoberts | B60N 2/2884 |
| 2017/0291515 A1 * | 10/2017 | Soltner | B60N 2/80 |
| 2017/0291516 A1 * | 10/2017 | Tat | B60N 2/4882 |

\* cited by examiner

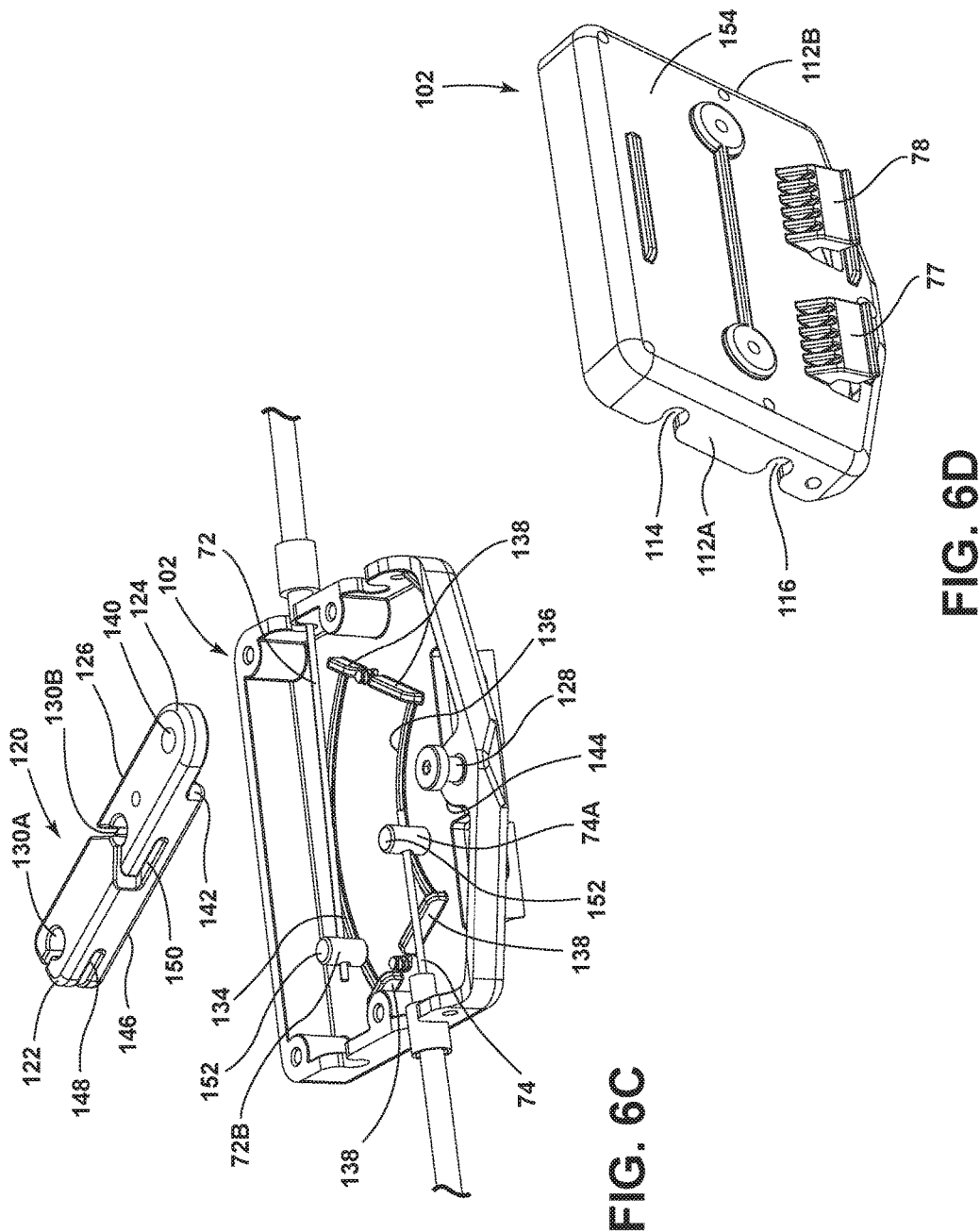

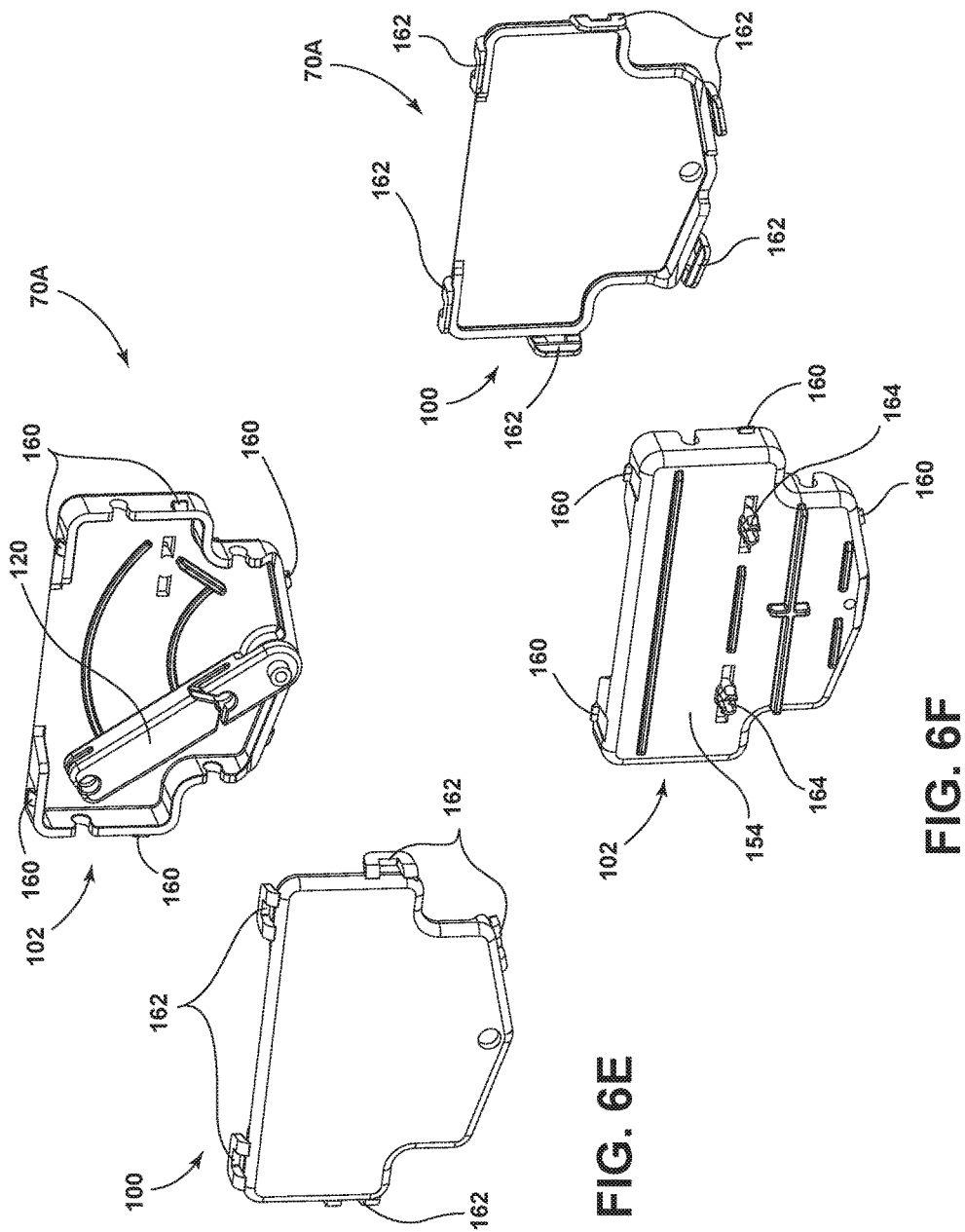

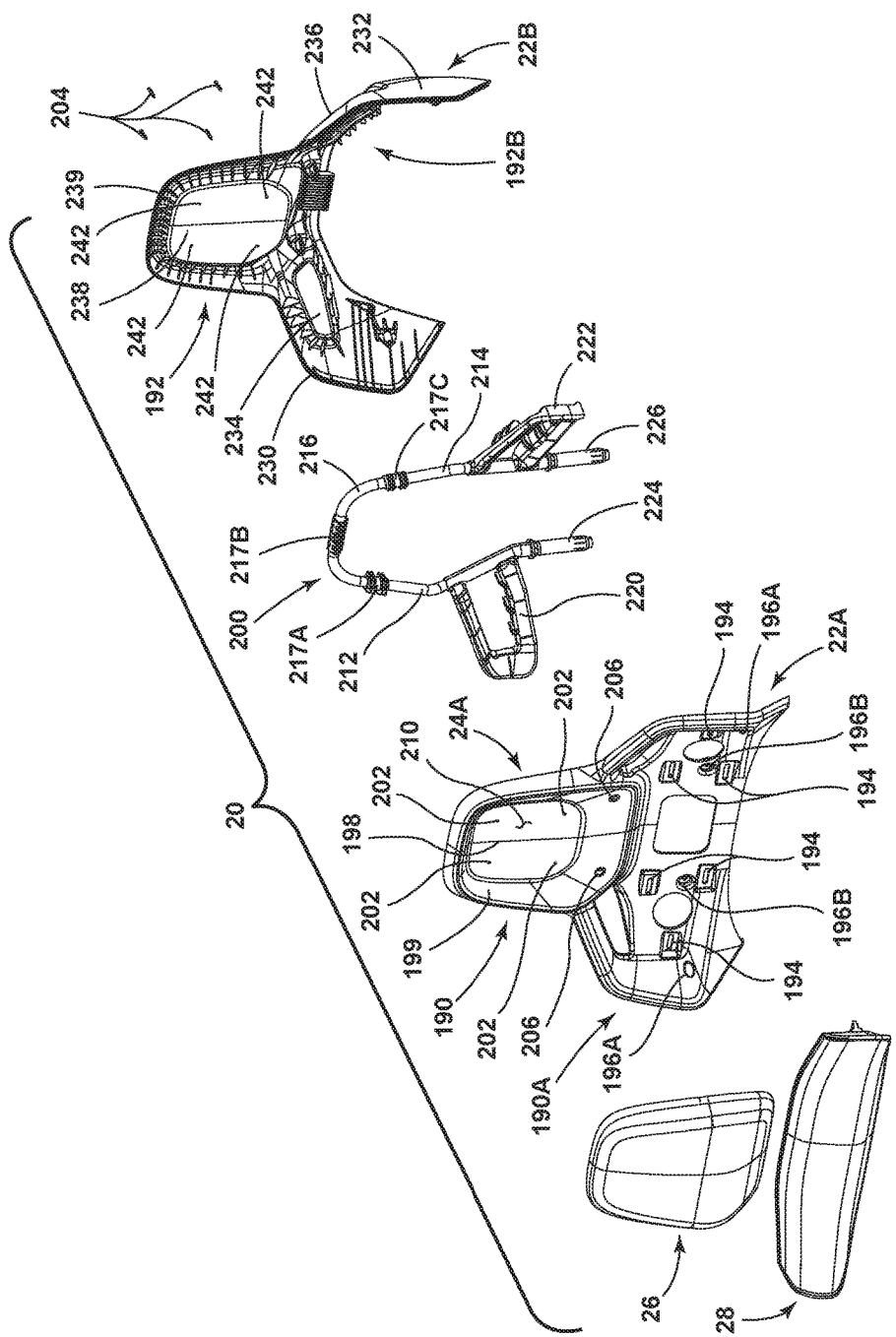

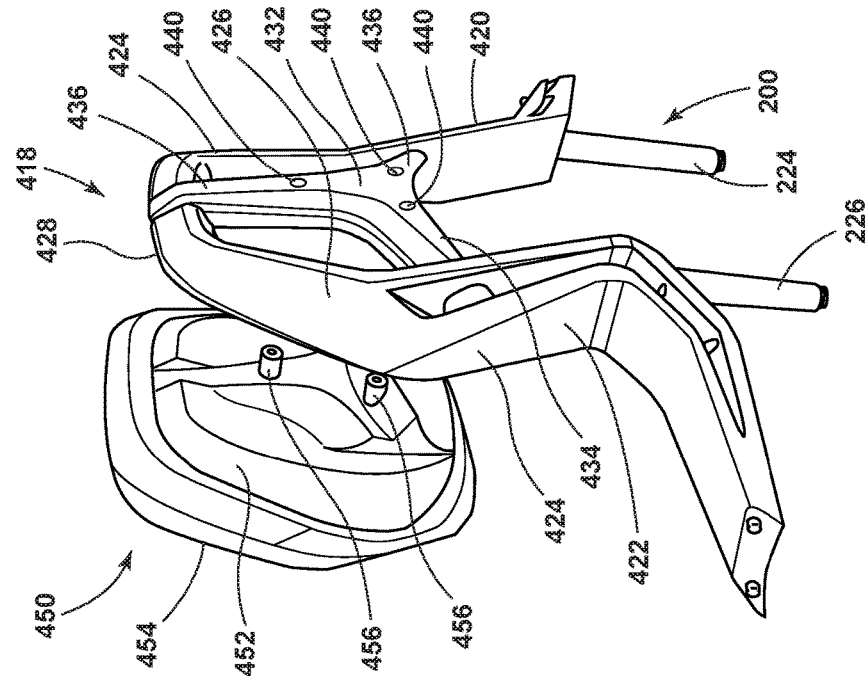
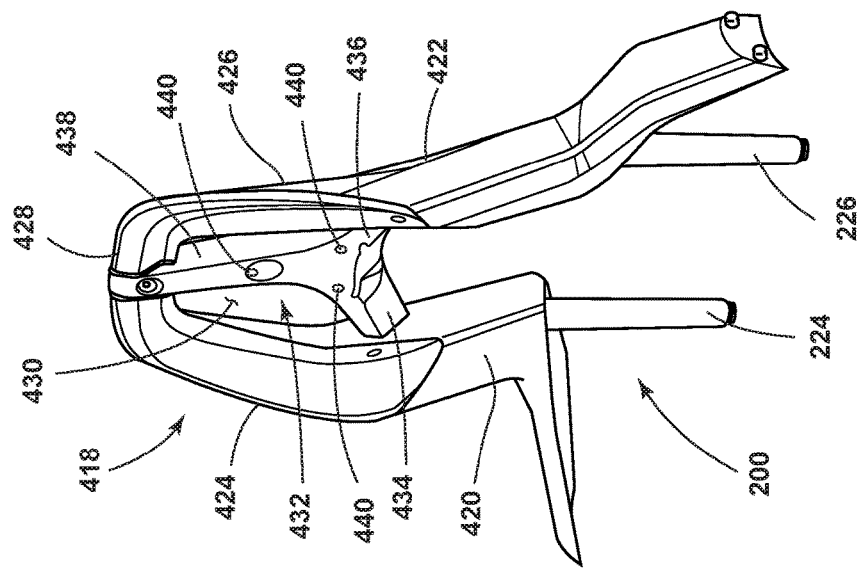

MODULAR HEAD RESTRAINT STRUCTURE AND STYLING ENABLEMENT FEATURES

FIELD OF THE INVENTION

The present invention generally relates to a vehicle seating assembly, and more particularly, to a vehicle seating assembly configured for high performance vehicles having specific weight and support requirements, wherein a head restraint assembly is adjustable to accommodate specific performance conditions, and further wherein the seatback includes an improved entry system as opposed to a fully rigid racing seat.

BACKGROUND OF THE INVENTION

In high performance vehicles, seat assemblies are configured to offer sufficient support and rigidity for keeping a vehicle occupant safely positioned within the seat assembly. Further, seat assemblies in high performance vehicles are often configured to provide the necessary support for a vehicle occupant while also being an overall light weight seat assembly to accommodate weight considerations for a high performance vehicle. While the seat assembly of a high performance vehicle must include the structural and support features necessary to keep a vehicle occupant safe, a need also exists to provide comfort and convenience features in high performance vehicles that may also be considered daily drivers. Thus, a headrest assembly having adjustability features for accommodating specific race day requirements (i.e., helmets) and seatbacks that provide improved access to rear seats are desired.

SUMMARY OF THE INVENTION

According to one aspect of the present invention, a headrest assembly for a vehicle seat having a front panel with a base portion and a support portion. A rear panel includes a base portion and a support portion. A support member includes first and second legs that are interconnected by an upper cross member. First and second support wings are coupled to the first and second legs of the support member and outwardly extend therefrom. The base portion of the front panel couples to a front side of the first and second support wings. The base portion of the rear panel couples to a rear side of the first and second support wings.

According to another aspect of the present invention, a headrest assembly having a support member with first and second support wings outwardly extending from opposite sides of the support member. A front panel includes a base portion coupled to the first and second support wings. A rear panel includes a base portion coupled to the first and second support wings, wherein the rear panel is further coupled to the front panel to surround the support member.

According to yet another aspect of the present invention, a headrest assembly having a support member. First and second support wings outwardly extend from opposite sides of the support member. The first and second support wings included a plurality of channels disposed thereon. A front panel includes a base portion having a plurality of support ribs. One or more of the support ribs of the font panel are received in one or more of the channels disposed on the first and second support wings. A rear panel includes a base portion. The base portion of the rear panel includes a plurality of support ribs. One or more of the support ribs of the rear panel are received in one or more of the channels disposed on the first and second support wings.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6C is a top perspective view of the second actuator exploded away from a base plate of the actuator housing of FIG. 6B;

FIG. 6D is a rear perspective view of the base plate of FIG. 6C;

FIG. 6E is an exploded top perspective view of an actuator housing according to another embodiment;

FIG. 6F is an exploded rear perspective view of the actuator housing of FIG. 6E;

FIG. 8A is an exploded front perspective view of a headrest assembly;

FIG. 13A is a front perspective view of a headrest assembly according to another embodiment;

FIG. 13B is a front perspective view of the headrest assembly of FIG. 13A having a headrest bun exploded away therefrom;

DETAILED DESCRIPTION OF THE PREFERRED EMBODIMENTS

Figure 1:
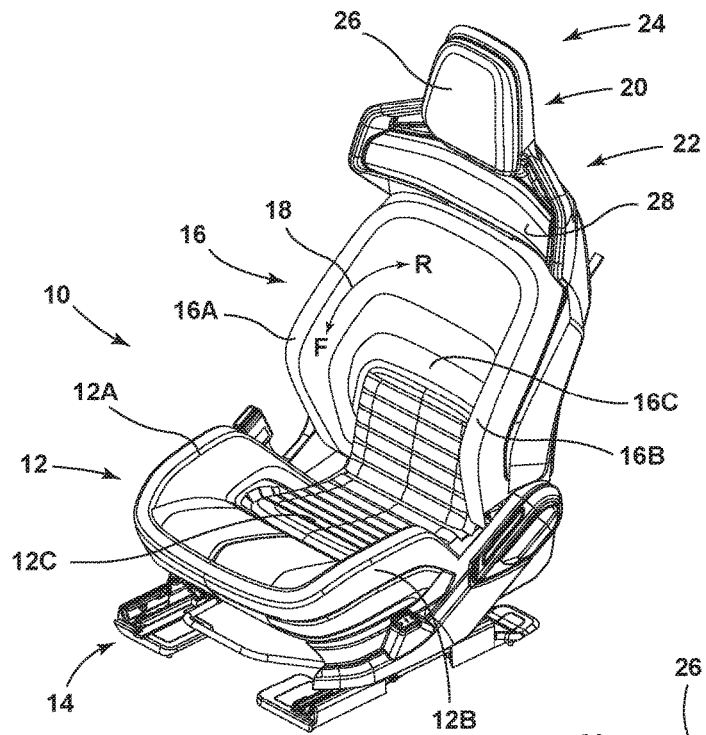
FIG. 1 is a front perspective view of a vehicle seat assembly according to one embodiment of the present invention.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally indicates a vehicle seat assembly. The vehicle seat assembly 10 shown in FIG. 1 is a highly contoured and stylized seat assembly that is configured for use in a high performance vehicle. The vehicle seat assembly 10 generally includes a seat member 12 which is supported on a track system 14 for linear movement between fore and aft positions. The vehicle seat 10 further includes a seatback 16 which is contemplated to be pivotally coupled to the seat member 12. The seatback 16 is contemplated to move between various positions along the path as indicated by arrow 18 between a full forward position F and a reclined position R. In FIG. 1, the seatback 16 is generally shown in an upright use position for properly supporting a vehicle occupant. The seat assembly 10 further includes a headrest assembly 20 having a base portion 22 and a support portion 24 which includes a cushioned headrest bun 26. The base portion 22 of the headrest assembly 20 further includes a thoracic support cushion 28 disposed on a front portion thereof. The headrest assembly 20 is designed to provide a robust support system for the head of a vehicle occupant as desired for use in a high performance vehicle where a vehicle occupant is subject to more intense forces as compared to a regular automotive vehicle given the speed, performance, and handling associated with a high performance vehicle.

To provide the enhanced support features desired in a high performance vehicle, the seat assembly 10 includes the robust headrest assembly 20 having a forwardly curved base portion 22 that has a width commensurate with a width of the seatback 16. The seatback 16 includes first and second side bolsters 16A, 16B disposed on opposite sides of an inset central portion 16C. The seat member 12 similarly includes first and second side bolters 12A, 12B which outwardly extend from a generally inset central portion 12C. With the first and second side bolsters 16A, 16B of the seatback 16 and the first and second side bolsters 12A, 12B of the seat member 12, the central portions 12C, 16C of the seat member 12 and seatback 16 generally define a bucket seat configuration for the vehicle seat assembly 10. The first and second side bolsters 12A, 12B, 16A, 16B are generally configured to properly position and support, retain a vehicle occupant while driving a high performance vehicle.

Figure 2:
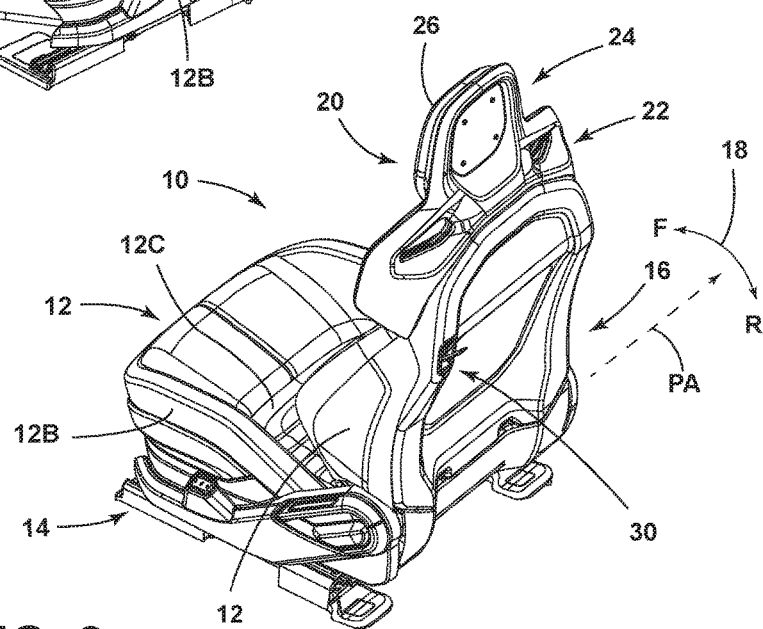
FIG. 2 is a rear perspective view of the vehicle seat assembly of FIG. 1.

Referring now to FIG. 2, the vehicle seat assembly 10 is shown from a rear perspective view, wherein a pivot access PA is indicated for movement of the seatback 16 relative to the seat member 12. As noted above, the seatback 16 is configured for movement between forward and rear positions F, R along the path as indicated by arrow 18. In FIG. 2, the seatback 16 is shown in an upright use position for supporting a vehicle occupant. The vehicle seat assembly 10 of the present invention includes a convenience feature for using the vehicle seat assembly 10 in a high performance vehicle that may also include a rear seating option. To this end, the vehicle seat assembly 10 includes an easy entry system which provides free movement of the seatback 16 to a full forward position F, wherein the seatback 16 is rotated forward towards the seat member 12 to provide access to a rear seating option. The full forward position may also be referred to as a forward dump position or an easy entry position. Rotation of the seatback 16 relative to the seat member 12 is provided along the pivot access PA along the rotational path as indicated by arrow 18. In the rear perspective view of FIG. 2, the seatback 16 is shown having a first actuator 30 disposed thereon. The first actuator 30 is operable between at-rest and actuated positions, as further described below, and is configured to release the seatback 16 for movement to the full forward position F when the first actuator 30 is moved to the actuated position. As shown in FIG. 2, the first actuator 30 is an exterior actuator accessible from a rear side of the seatback 16.

Figure 3:
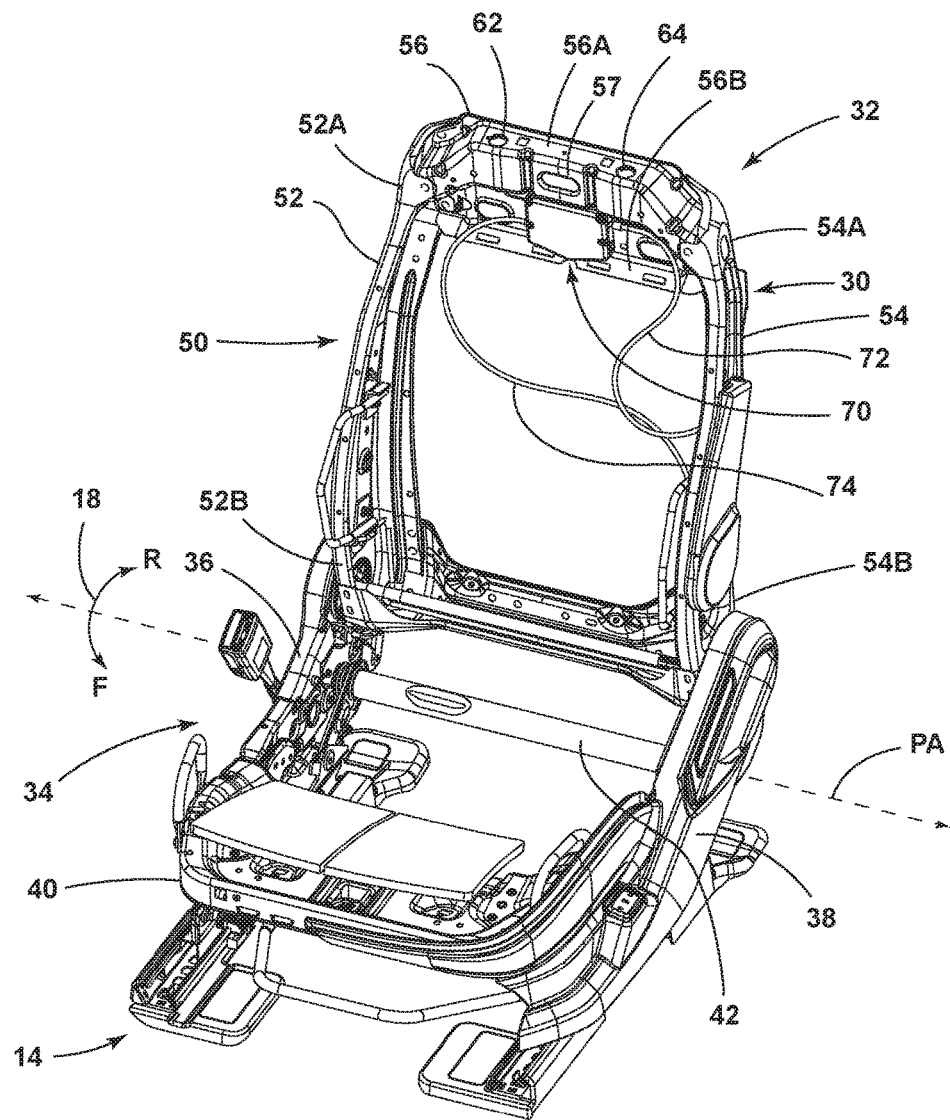
FIG. 3 is a front perspective view of internal frame components of the vehicle seat assembly of FIG. 1.

Referring now to FIG. 3, a frame assembly 32 is shown having a seat member frame 34 coupled to the track assembly 14. The seat member frame 34 includes first and second side members 36, 38 which are interconnected by front and rear cross members 40, 42. The frame assembly 32 further includes a seatback frame 50 having first and second side members 52, 54 which are interconnected by upper and lower cross members 56, 58. The first and second side members 52, 54 include upper portions 52A, 54A and lower portions 52B, 54B. The upper portions 52A, 54A of the first and second side members 52, 54 are coupled to the upper cross member 56, while the lower portions 52B, 54B of the first and second members 52, 54 are coupled to the lower cross member 54. The lower portions 52B, 54B of the first and second side members 52, 54 are further coupled to the side members 36, 38 of the seat member frame 34 in a pivoting manner, such that the seatback frame 50 is configured to pivot along the pivot access PA along the path as indicated by arrow 18. As the frame assembly 32 is configured to support the seat member 12 and seatback 16 of the vehicle seat 10 shown in FIG. 1, one of ordinary skill in the art will appreciate that movement of the seatback frame assembly 50 correlates to movement of the seatback 16 as described throughout the present disclosure.

As further shown in FIG. 3, the first actuator 30 is shown mounted to the second side member 54 of the seatback frame 50 at the upper portion 54A of the second side member 54. While the first actuator 30 is shown conveniently located at this position on the second side member 54, it is contemplated that the first actuator 30 may be disposed on any portion of the frame assembly 32 that is readily accessible by a user for adjusting a position of the seatback frame 50. Movement of the seatback frame 50 to the full forward position F is generally provided by the release of a recliner mechanism coupled between the seatback frame 50 and seat member frame 34, as further described below.

As further shown in FIG. 3, the upper cross member 56 of the seatback frame 50 includes upper and lower portions 56A, 56B, wherein the upper portion 56A includes receiving apertures 62, 64 which are configured to receive guide sleeves for supporting the headrest assembly 20 (FIG. 1) from the upper cross member 56 of the seatback frame 50. The upper portion 56A further includes mounting aperture 57 which is configured to receive a mounting structure 330 (FIG. 10D) of the headrest assembly 20 for supporting the headrest assembly 20 from the upper cross member 56 of the seatback frame 50. The lower portion 56B of the upper cross member 56 includes an actuator housing 70 coupled to a front side thereof. The actuator housing 70 is configured to house a second actuator as further described below. In the embodiment shown in FIG. 3, the actuator housing 70 includes first and second cables 72, 74 connected thereto. The first cable 72 is shown directed towards the second side member 54 of the seatback frame 50 and couples to the first actuator 30 in assembly, as further described below. The second cable 74 is shown coupled to the actuator housing 70 on an opposite side thereof relative to the first cable 72, wherein the second cable 74 is also directed towards the second side member 54 of the seatback frame 50 for coupling to a recliner mechanism, as further described below. With the first and second cables 72, 74 shown directed to the second side member 54 of the seatback frame 50, and having the first actuator 30 supported by the second side member 54 of the seatback frame 50, it is contemplated that the vehicle seat 10 (FIG. 1) is a driver's side seat assembly, wherein the second side members 54, 38 of the frame assembly 32 are the outer side members generally made accessible to a user when a driver's side door is open. However, it is contemplated that the concepts disclosed herein are not limited to a driver's side seat assembly, and may be used in conjunction with any seat assembly positioned within an interior of a vehicle.

Figure 4A:
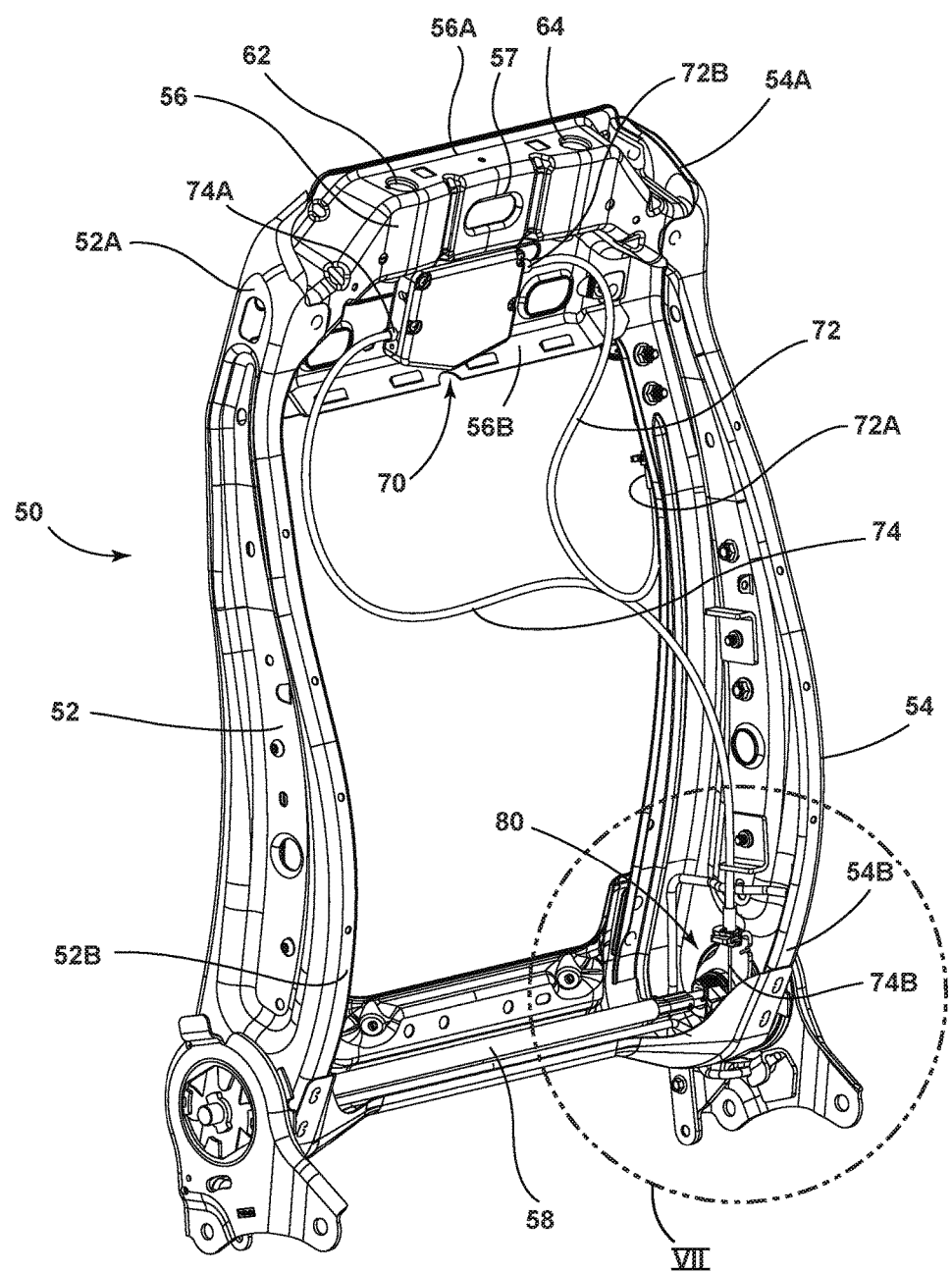
FIG. 4A is a front perspective view of a seatback frame assembly having a seatback frame adjustment system.

Referring now to FIG. 4A, the seatback frame 50 is shown with first cable 72 having a second end 72B coupled to an upper portion of the actuator housing 70. Second cable 74 is shown having a first end 74A coupled to a lower portion of the actuator housing 70 on an opposite side of the actuator housing 70 relative to the attachment of the second end 72B of the first cable 72. As further shown in FIG. 4A, the second cable 74 further includes a second end 74B that is coupled to a recliner mechanism 80. The recliner mechanism 80 is contemplated to be a standard recliner mechanism known in the art for retaining the seatback frame 50 in an upright use position, such as the position of the seatback 16 shown in FIG. 1. The recliner mechanism 80 is configured to provide a reclining feature for the seatback 16 along the path as indicated by arrow 18. The recliner mechanism 80 is also used to release the seatback frame 50 for free movement along the path as indicated by arrow 18 to the full forward position F as indicated in FIG. 1. Thus, the recliner mechanism 80 is operable between locked and release positions, wherein the seatback frame 50 moves freely relative to the seat member 12 when the recliner mechanism 80 is in the release position. The recliner mechanism 80 is moved to the release position when the first actuator 30 is moved from an at-rest position to an actuated position, as further described below. Connection of the second end 74B of the second cable 74 to the recliner mechanism 80 is best shown and described below with specific reference to FIG. 7.

Figure 4B:
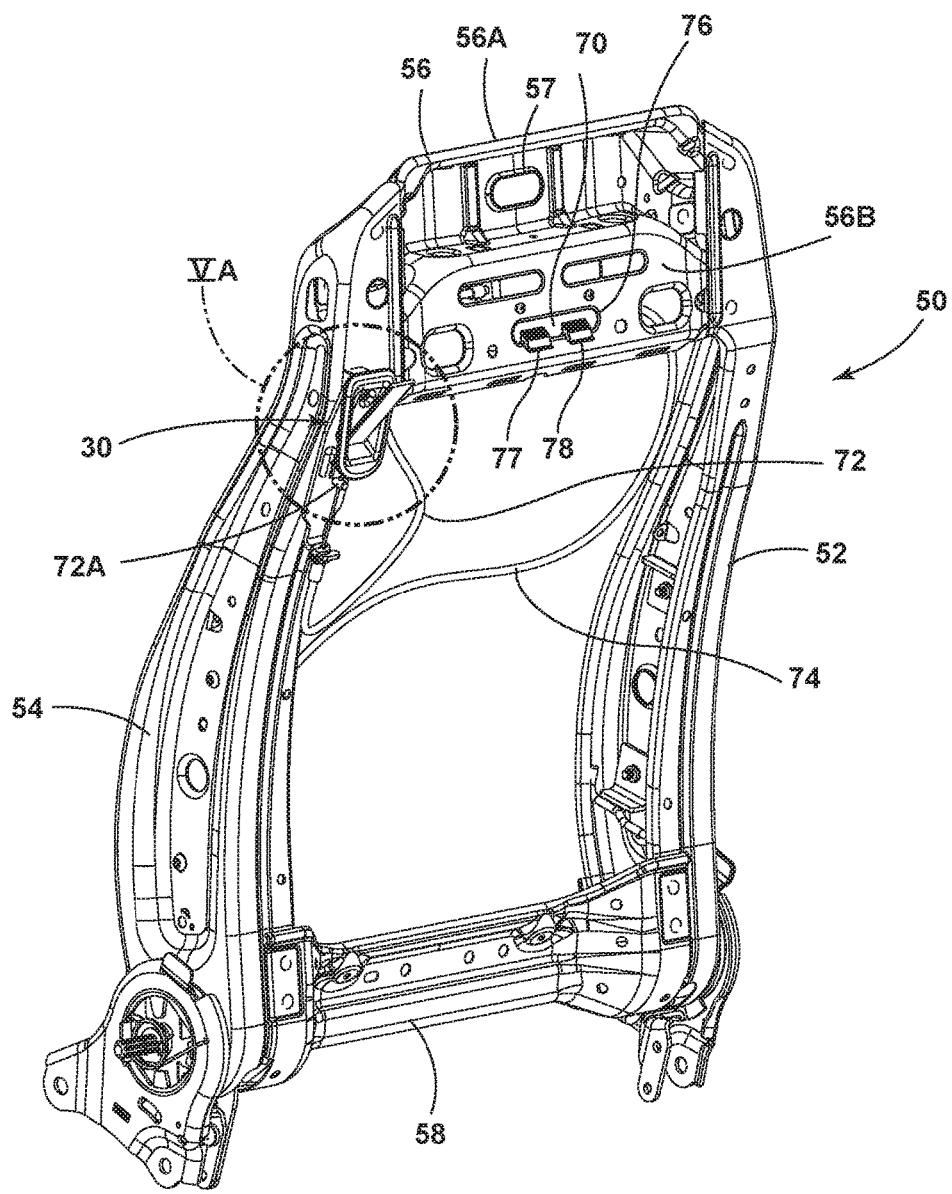
FIG. 4B is a rear perspective view of the seatback frame assembly of FIG. 4A.

Referring now to FIG. 4B, the first cable 72 is shown having a first end 72A which is operably couple to the first actuator 30 which is further coupled to second side member 54 of the seatback frame 50. The upper cross member 56 of the seatback frame 50 is shown having a mounting aperture 56 disposed on the lower portion 56B thereof. The mounting aperture 56 is shown in FIG. 4B as having first and second hook members 77, 78 extending therethrough, wherein the first and second hook members 77, 78 rearwardly extend from the actuator housing 70 to couple the actuator housing 70 to the mounting aperture 76 of the upper cross member 56 of the seatback frame 50.

Figure 5A:
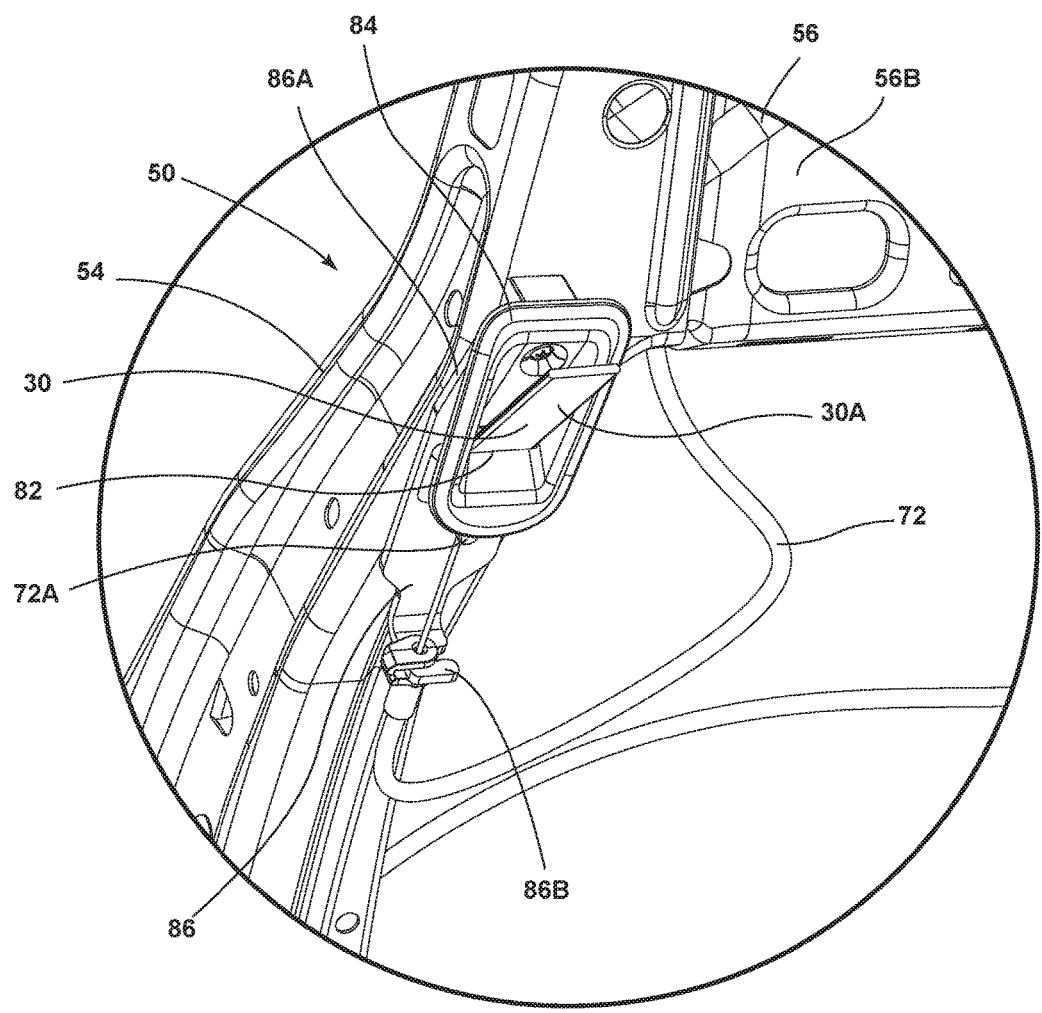
FIG. 5A is a close-up view of a first actuator taken at location VA of FIG. 4B.
Figure 5B:
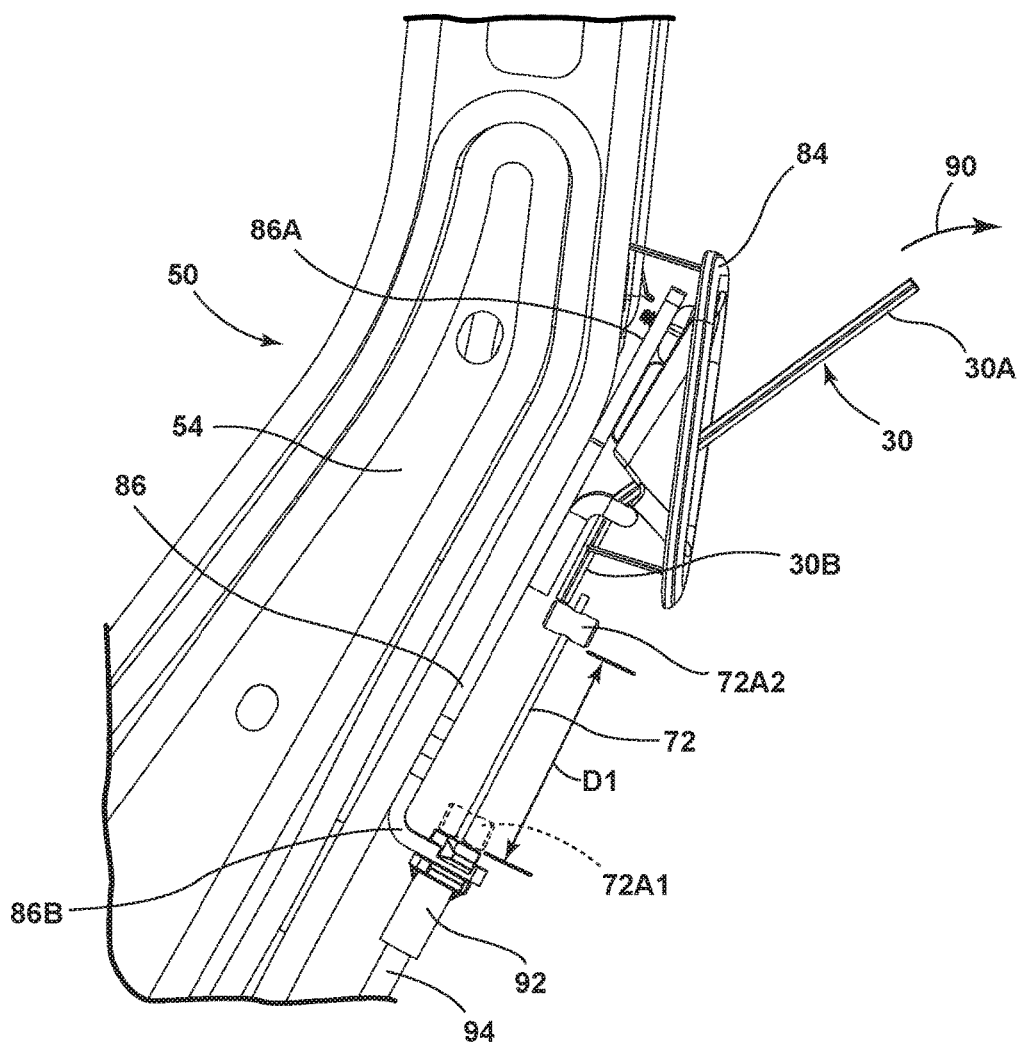
FIG. 5B is a side elevational view of the first actuator of FIG. 5A.

Referring now to FIG. 5, the first actuator 30 is shown in the form of a strap extending outwardly from a receiving aperture 82 of a trim component 84. The trim component 84 is configured to couple to a rear portion of the seatback 16 as shown in FIG. 2 while the actuator 30 extends outwardly therefrom through receiving aperture 82. A support bracket 86 is shown coupled to second side member 54 of the seatback frame 50 and includes an upper end 86A coupled to trim component 84, and a lower end 86B coupled to first cable 72. First end 72A of the first cable 72 is coupled to the first actuator 30 at a coupling portion 30B thereof, as best shown in FIG. 5B. The first actuator 30 includes a handle portion 30A and a coupling portion 30B (FIG. 5B), wherein the handle portion 30A outwardly extends from the seatback 16 of the vehicle seat assembly 10 (as shown in FIG. 2), such that the first actuator 30 is easily accessed by a user. As noted above, the first actuator 30 may be a strap member which may include a loop portion for better engagement by a user at the handle portion 30A, or may include any type of rubberized grip portion disposed on the handle portion 30A.

Referring now to FIG. 5B, the first actuator 30 is shown in an actuated position, wherein the handle portion 30A of the actuator 30 is contemplated to have been pulled upwardly and outwardly in a direction as indicated by arrow 90 from an at-rest position towards the actuated position. When moving the first actuator 30 from the at-rest position to the actuated position (shown in FIG. 5B), the first end 72A of cable 72 travels a first distance D1 as indicated in FIG. 5B. Specifically, the first end 72A of first cable 72 is shown in phantom at reference numeral 72A1 which correlates to the position of the first end 72A when the first actuator 30 is in the at-rest position. With the actuator 30 in the actuated position shown in FIG. 5B, the first end 72A of first cable 72 is contemplated to move from the position indicated at 72A1, to the position indicated at 72A2. This movement of the first cable 72 is equal to a first distance D1 which is approximately 43-44 mm. As further shown in FIG. 5B, mounting bracket 86 is coupled to the second side member 54 of the seatback frame 50 and is coupled to the trim component 84 housing the first actuator 30 at an upper end 86A thereof. At a lower end 86B of the mounting bracket 86, a cap 92 of the first cable 72 is shown retained thereon. The cap 92 is disposed over an end of a cable housing 94 of the first cable 72 which generally protects the first cable 72 as positioned within the vehicle seat assembly 10. Thus, as shown in FIG. 5B, the actuation stroke of the first actuator 30 is an upward and outward movement in the direction as indicated by arrow 90 that is approximately 43-44 mm, however, other lengths for an actuator stroke of the first actuator 30 are also contemplated. With the coupling portion 30B of the first actuator 30 being coupled to the first end 72A of the first cable 72, the movement or travel of the first cable 72 is generally equal to the movement of the first actuator 30 from the at-rest position to the actuated position, such that the first distance D1 of travel of the first cable 72 is contemplated to be approximately 43-44 mm like the actuation stroke of the first actuator 30.

Figure 5C:
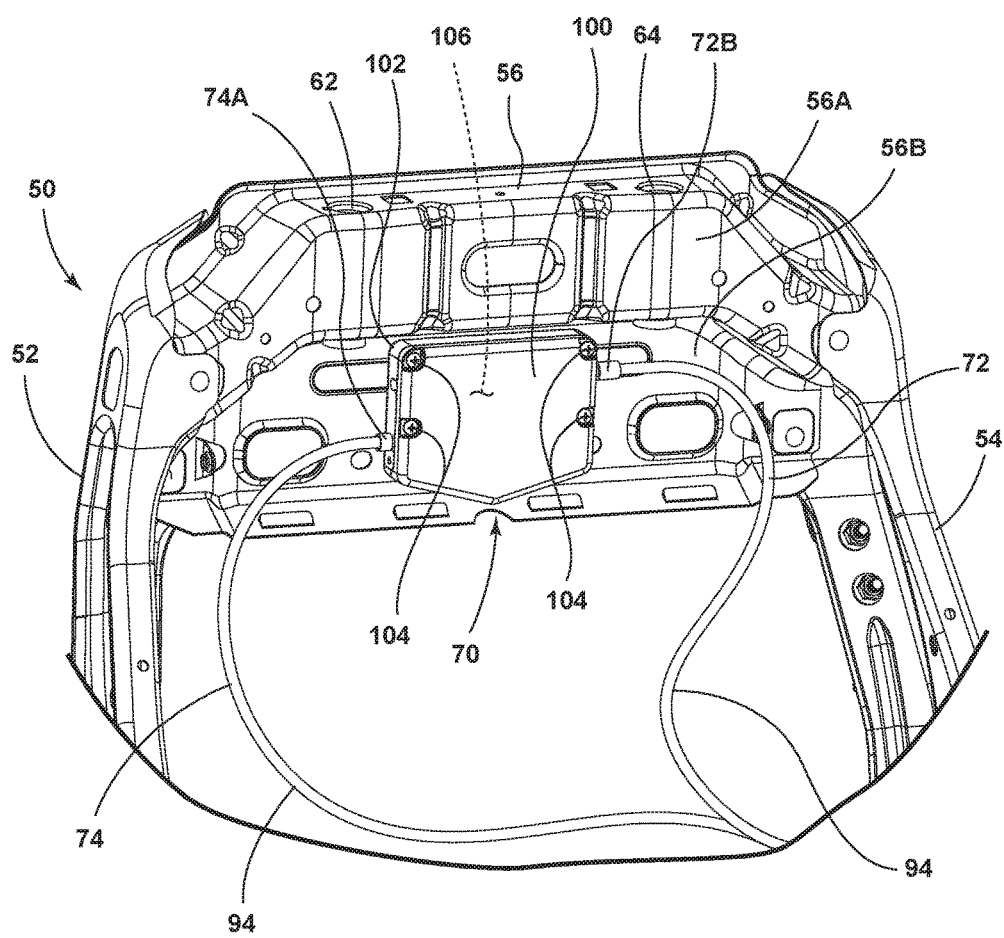
FIG. 5C is a fragmentary front perspective view of an upper portion of the seatback frame assembly of FIG. 4A showing an actuator housing.

Referring now to FIG. 5C, the actuator housing 70 is shown coupled to the lower portion 56B of the upper cross member 56 of the seatback frame 50. The actuator housing 70 includes a cover member 100 coupled to a base plate 102 by fasteners 104 to define a cavity 106 disposed between the cover member 100 and base plate 102. As further shown in FIG. 5C, the second end 72B of first cable 72 feeds into the cavity 106 of the actuator housing 70, while first end 74A of the second cable 74 feeds into the cavity 106 of the actuator housing 70 on an opposite side thereof relative to the first cable 72. The first and second cables 72, 74 each include cable housings 94 and are operably coupled to a second actuator housed within the actuator housing 70 for movement therewith, which will now be described.

Figure 6A:
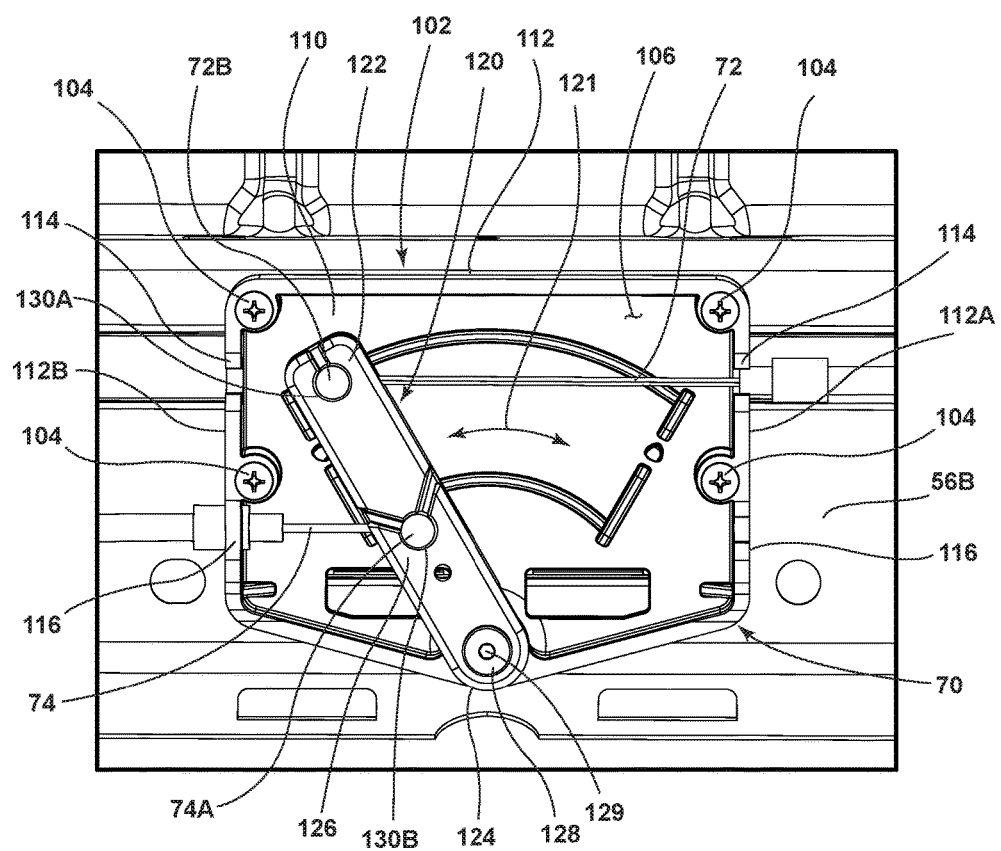
FIG. 6A is a front elevational view of the actuator housing of FIG. 5C with a cover member removed to reveal a second actuator shown in an at-rest position.

Referring now to FIG. 6A, the base plate 102 of the actuator housing 70 is shown having a rear surface 110 with an outwardly extending perimeter portion 112 disposed therearound. The outwardly extending perimeter portion 112 includes first and second side members 112A, 112B disposed on opposite sides of the base plate 102. Each of the first and second side members 112A, 112B include upper and lower access apertures 114, 116. The first cable 72 enters the cavity 106 of the actuator housing 70 at the upper access aperture 114 disposed through side member 112A. The second cable 74 accesses the cavity 106 of the actuator housing 70 at lower access aperture 116 of side member 112B. As further shown in FIG. 6A, a second actuator 120 is disposed within the cavity 106 of the actuator housing 70 for movement along a path as indicated by arrow 121 between at-rest and actuated positions. In the embodiment shown in FIG. 6A, the second actuator 120 is shown in the at-rest position. The second actuator 120 includes upper and lower portions 122, 124 with an intermediate portion 126 disposed therebetween. As shown in FIG. 6A, the lower portion 124 is pivotally coupled to the base plate 102 at fastener 128, thereby defining a pivot point 129 for the second actuator 120 relative to the base plate 102. The second end 72B of the first cable 72 is shown coupled to a first mounting aperture 130A disposed at the upper portion 122 of the second actuator 120. The first end 74A of the second cable 74 is shown coupled to a second mounting aperture 130B disposed at the intermediate portion 126 of the second actuator 120. In this way, the first cable 72 is coupled to an upper portion 122 of the second actuator 120, while the second cable 74 is coupled to an intermediate portion 126 of the second actuator 120. The first and second mounting apertures 130A, 130B of the second actuator 120 are spaced-apart from one another at difference distances relative to the central pivot point 129, thereby affecting the length of cable pulled when the second actuator 120 is moved between the at-rest position and the actuated position.

Figure 6B:
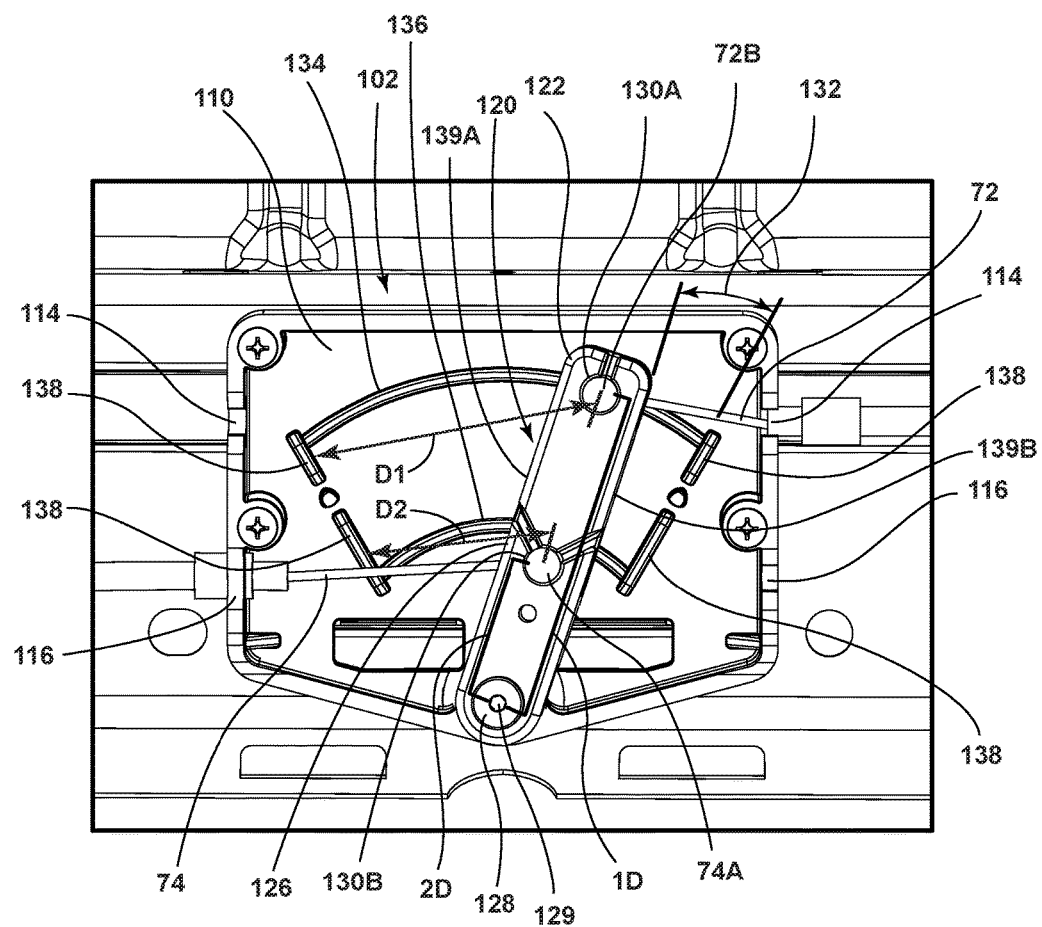
FIG. 6B is a front elevational view of the second actuator of FIG. 6A in an actuated position.

With specific reference to FIG. 6B, the distance of the first mounting aperture 130A from the pivot point 129 is represented by a first distance 1D (contemplated to be approximately 56 mm). The distance of the second mounting aperture 130B from the pivot point 129 is represented as a second distance 2D (contemplated to be approximately 25 mm). Thus, as shown in FIG. 6B, the first distance 1D of the pivot point 129 to the first mounting aperture 130A is greater than the second distance 2D disposed between the pivot point 129 and the second mounting aperture 130B. In fact, the first distance 1D is more than double the second distance 2D. This is generally due to the illustrated configuration wherein the first mounting aperture 130A is disposed at the upper portion 122 of the second actuator 120, while the second mounting aperture 130B is disposed at the intermediate portion 126 of the second actuator 120. This variance in distance between first and second distances 1D, 2D correlates to a reduced length of travel for the second cable 74 as compared to a distance traveled by the first cable 72 during an actuation sequence.

With further reference to FIG. 6B, the second end 72B of the first cable 72 is coupled to the upper portion 122 of the second actuator 120 at first mounting aperture 130A. As noted above, with reference to FIGS. 5A and 5B, the first end 72A of the first cable 72 is coupled to the first actuator 30 at coupling portion 30B. Thus, when the first actuator 30 is moved to the actuated position (FIG. 5B), the second actuator 120 moves from the at-rest position (FIG. 6A) to the actuated position (FIG. 6B). This distance generally correlates to the first distance D1 of travel for the first cable 72 at the first actuator 30. Thus, the distance traveled by the second end 72B of the first cable 72 as coupled to mounting aperture 130A of second actuator 120 from the at-rest position to the actuated position is approximately 43-44 mm. As a corollary, the first end 74A of second cable 74 will move approximately 20 mm from the position of the first end 74A shown in FIG. 6A to the position of the second end at 74A shown in FIG. 6B. This is due to the intermediate location of the second mounting aperture 130B on the second actuator 120. Thus, the movement of the first actuator 30 draws the first end 72A of the first cable 72 upward, which translates to a lateral pull of the first cable 72 at second end 72B as coupled to the second actuator 120. This makes the movement of the first cable 72 an input movement on the second actuator 120. Movement of the second actuator 120 from the at-rest position (FIG. 6A) to the actuated position (FIG. 6B) causes the first end at 74A of second cable 74 to move approximately 20 mm in response to the input action by the first cable 72. As such, the movement of the second cable 74 is an output movement which translates to a release of the recliner mechanism 80 as further described below with reference to FIG. 7. Thus, the movement of the second cable 74 in response to the input movement of the first cable 72 is less than half the distance traveled by the first cable 72.

Figure 7:
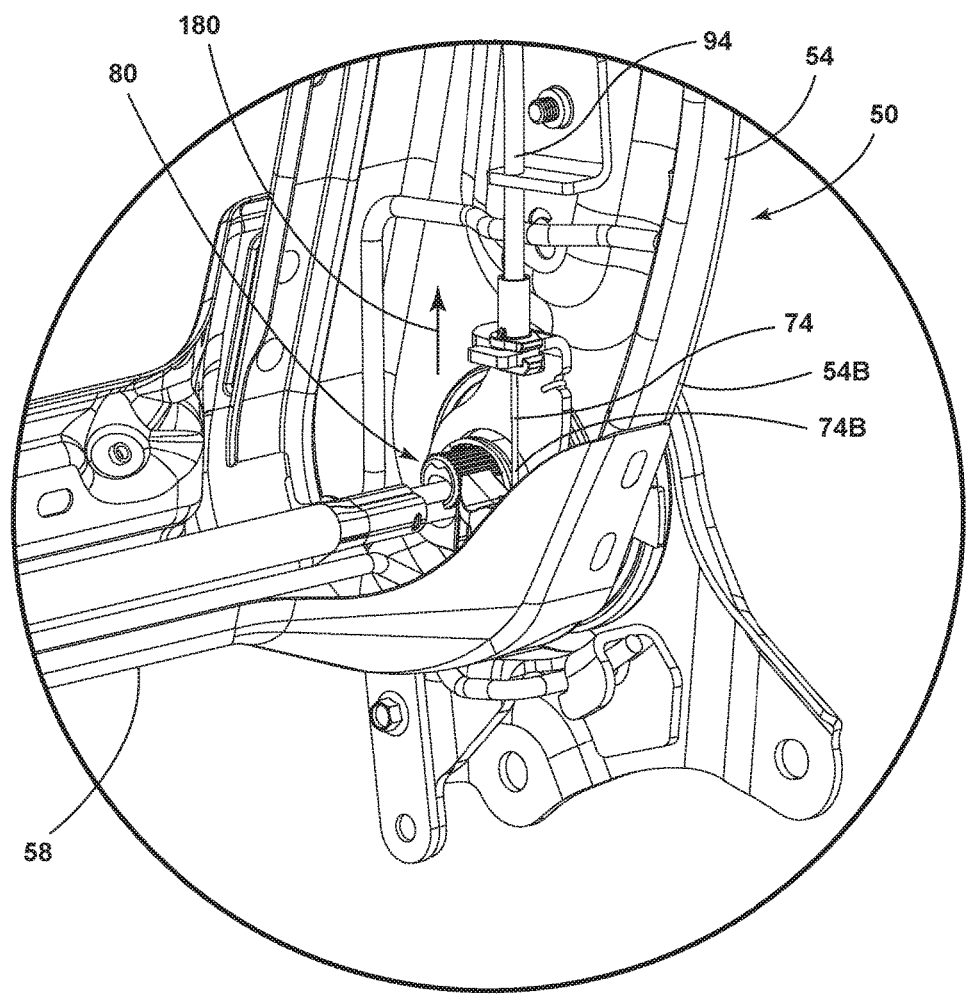
FIG. 7 is a fragmentary top perspective view of a recliner mechanism coupled to the seatback frame of FIG. 4A taken at location VII.

As further shown in FIG. 6B, the second actuator 120 may also move beyond the actuated position shown in FIG. 6B to a range identified by reference numeral 132 which indicates an over-travel position for the second actuator 120. From the actuated position shown in FIG. 6B to the full range of the over-travel position 132, the first cable 72 is contemplated to move approximately 70 mm. Similarly, with the second actuator 120 moved to the full over-travel position identified in the range 132, the second cable 74 will travel approximately 29 mm. In this way the second actuator 120 operates between the at-rest position shown in FIG. 6A to the actuated position shown in FIG. 6B with a travel distance of approximately 45 mm. The second actuator 120 can further move approximately another 15 mm to the full over-travel position to ensure that the necessary amount of cable travel for the second cable 74 will occur to sufficiently cause the release of the recliner mechanism 80 (FIG. 7).

As further shown in FIG. 6B, the rear surface 110 of the base plate 102 includes first and second raised guide rails 134, 136 which are configured to guide the movement of the second actuator 120 in a low friction manner between at-rest, actuated, and over-travel positions. Each of the first and second raised guide rails 134, 136 include first and second abutment members 138 disposed at opposite ends thereof for limiting movement of the second actuator 120 beyond the over-travel position and at the at-rest position by abutting opposite side surfaces 139A, 139B of the second actuator 120. Further, it is contemplated that the second actuator 120 is biased to the at-rest position by a biasing mechanism disposed along the adjustment assembly.

Referring now to FIG. 6C, the second actuator 120 is shown exploded away from the base plate 102 and it is shown having a receiving aperture 140 disposed therethrough at the lower portion 124 of the second actuator 120. The receiving aperture 140 is configured to receive the fastener 128 which couples to the base plate 102 for pivotal movement of the second actuator 120. The second actuator 120 further includes a stepped guide 142 which aligns to an arched guide 144 of the base plate 102 to guide movement of the second actuator 120 in an arcuate manner. The second actuator 120 further includes a rear surface 146 which is configured to contact the raised guide rails 134, 136 of the base plate 102 in assembly for sliding movement of the second actuator 120 thereon. As further shown in FIG. 6, the first and second mounting apertures 130A, 130B include access slots 148, 150 which are used to guide the first and second cables 72, 74 into their respective mounting apertures 130A, 130B. As further shown in FIG. 6C, the second end 72B of first cable 72 includes an engagement member 152 in the form of a barrel which is received in the mounting aperture 130A, while the first cable 72 is threaded through the access slot 148 of the second actuator 120 when mounting the first cable 72 to the second actuator 120. Similarly, a barrel 152 disposed on the first end 74A of second cable 74 is received in mounting aperture 130B of second actuator 120 while the second cable 74 is threaded through access slot 150 of the second actuator 120.

Referring now to FIG. 6D, an outer surface 154 of the base plate 102 is shown disposed on an opposite side of the base plate 102 relative to the rear surface 110 and includes the first and second hook members 77, 78 which are used to couple and support the actuator housing 70 to the upper cross member 56 of the seatback frame as best shown in FIG. 4B.

Referring now to FIGS. 6E and 6F, another embodiment of an actuator housing 70A is shown which includes a number of features which are similar to features found in the actuator housing 70 described above, for which like reference numerals will be used. The cover member 100 of the actuator housing 70A is shown exploded away from a base plate 102, wherein the base plate 102 includes a plurality of engagement features 160 disposed around a perimeter thereof in the form of resilient spring finger clips. Accordingly, the cover member 100 includes a plurality of engagement features 162 extending off a perimeter thereof which are shown in the form of U-shaped receptacles configured to receive the clips of the engagement features 160 of the base plate 102. In this way, the cover member 100 can clip to the base plate 102 to define the housing 106 in which the second actuator 120 moves without the need for separate fasteners. Further, with specific reference to FIG. 6F, the outer surface 154 of the base plate 102 includes resilient clip members 164 which can be used to releasably clip the base plate 102 to the upper cross member 56 of the seatback frame assembly 50 for securing the actuator housing 70A thereto.

Figure 6G:
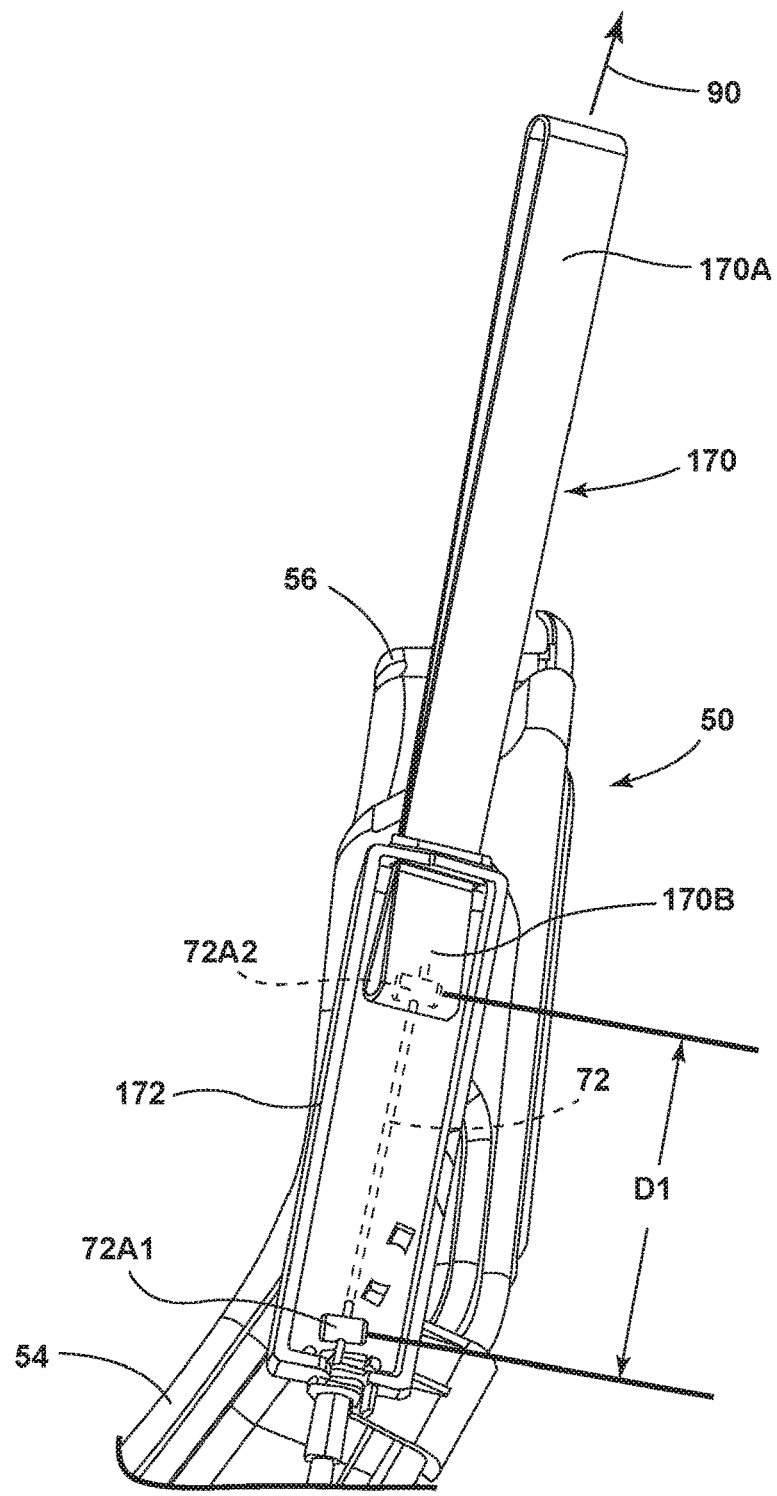
FIG. 6G is a side elevational view of the first actuator of FIG. 6H.
Figure 6H:
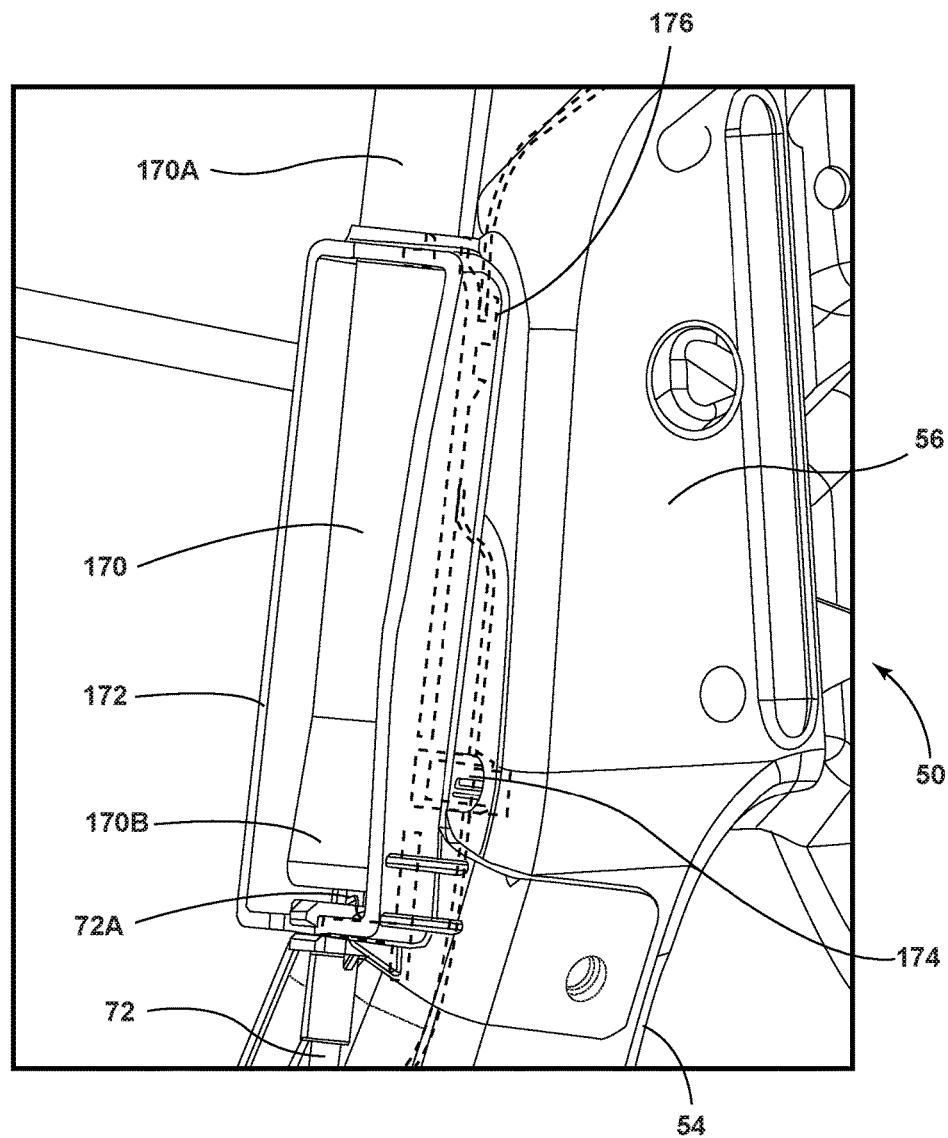
FIG. 6H is a fragmentary front perspective view of another embodiment of a first actuator coupled to a seatback frame.

Referring now to FIG. 6H, another embodiment of the first actuator 170 is shown disposed within a trim component 172 which couples to the second side member 54 of the seatback frame 50 using one or more resilient clip members 174, as well as an upper engagement feature 176. In assembly, it is contemplated that the trim component 172 is positioned on the second side member 54 of the seatback frame assembly 50 at the upper engagement member 176 and then clipped into place using the resilient clip member 174 for securely mounting the trim member 172 thereto. In the embodiment shown in FIG. 6H, the first actuator 170 includes a coupling portion 170B and a handle portion 170A, wherein the coupling portion 170B is coupled to the first end 72A of the first cable 72, such that the first cable 72 travels with the first actuator 170 between at-rest and actuated positions. In FIG. 6H, the first actuator 170 is shown in an at-rest position. With reference to FIG. 6G, the first actuator 170 is shown in the actuated position, wherein the loop shaped handle portion 170A is contemplated to have been engaged by a user and lifted upwardly in the direction indicated by arrow 90 to move the first actuator 170 from the at-rest position to the actuated position. In so doing, the first end 72A of cable 72 will move from a first position (identified as 72A1) to a second position (identified as 72A2). The first and second positions 72A1, 72A2 identify at-rest and actuated positions for the first end 72A of the first cable 72 when the first actuator 170 moves between at-rest and actuated positions as shown in FIGS. 6H and 6G.

Referring now to FIG. 7, the second cable 74 is shown having the second end 74B coupled to a recliner mechanism 80 disposed on the seatback frame 50. As noted above, the recliner mechanism 80 is a recliner mechanism known in the art and operable between locked and release positions, wherein the seatback frame 50 can move to the full forward position F (FIG. 1) when the recliner mechanism 80 is in the release position. The recliner mechanism 80 moves from the locked position to the release position as the second cable 74 moves upward in a direction indicated by arrow 180 to release the recliner mechanism 80. As noted above, the second cable 74 is pulled as an output response to the second actuator 120 as actuated by the first actuator 30 via first cable 72. Thus, in an overview sense, the first actuator 30 is coupled to a first end 72A of first cable 72 as shown in FIG. 5B. The first cable 72 includes a second end 72B which is coupled to the first mounting aperture 130A of second actuator 120 shown in FIG. 6A. First end 74A of second cable 74 is coupled to mounting aperture 130B of second actuator 120, as also shown in FIG. 6A. With further reference to FIG. 7, the second end 74B of second cable 74 is coupled to the recliner mechanism 80 for moving the recliner mechanism 80 from a locked position to a release position. As such, when the first actuator 30 moves to the actuated position (FIG. 5B), the second actuator 120 moves to the actuated position (FIG. 6B). Movement of the second actuator 120 to the actuated position shown in FIG. 6B pulls the second cable 74 in an upward direction as indicated by arrow 180 at the recliner mechanism 80 to release the recliner mechanism 80, thereby allowing movement of the seatback frame 50 (and seatback 16) to a full forward position to better provide access to a rear seating option in a vehicle.

Referring now to FIG. 8A, the headrest assembly 20 of the vehicle seat 10 shown in FIG. 1 is shown in an exploded view. In the exploded view of FIG. 8A, the headrest assembly 20 is shown having a front panel 190 having a base portion 22A and a support portion 24A. The headrest assembly 20 further includes a rear panel 192 having a base portion 22B and a support portion 24B. Together, the base portion 22A of the front panel 190 and the base portion 22B of the rear panel 192 cooperate to define the base portion 22 of the headrest assembly 20 shown in FIG. 1. Similarly, the support portions 24A, 24B of the front and rear panels 190, 192 cooperate to define the support portion 24 of the vehicle seat 10 shown in FIG. 1. In assembly, the front and rear panels 190, 192 couple to one another and further couple to a support member 200 that is configured to support the headrest assembly 20 from the seatback frame 50 (FIG. 3), as further described below. In assembly, the headrest bun 26 of the headrest assembly 20 is configured to be removeably coupled to the support portion 24A of the front panel 190. The thoracic support cushion 28 of the headrest assembly 20 is also configured to couple to the base portion 22A of the front panel 190. The headrest bun 26 and thoracic support cushion 28 are shown coupled to the front panel 190 in the embodiment shown in FIG. 1.

Figure 8B:
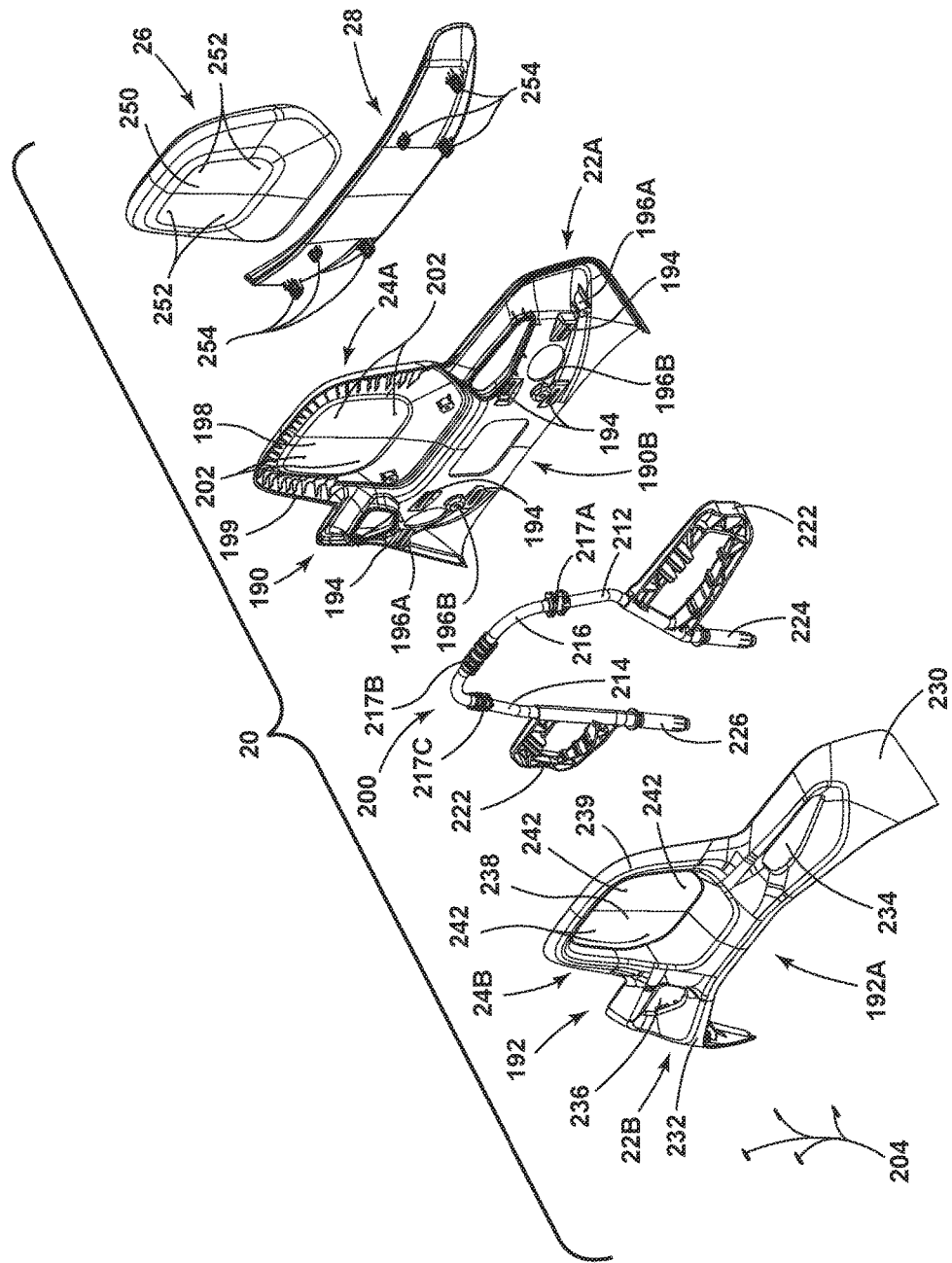
FIG. 8B is an exploded rear perspective view of the headrest assembly of FIG. 8A.

As further shown in FIG. 8A, the front panel 190 includes a front outer surface 190A. The front outer surface 190A includes a plurality of mounting slots 194 which are configured to couple to clip members of the thoracic support cushion 28 as better shown in FIG. 8B. The base portion 22A of the front panel 190 is a forwardly curved portion having a width that is commensurate with a width of the seatback 16 shown in FIG. 1. In this way, the base portion 22A extends outwardly past the parameters of the support portion 24A. The forwardly curved configuration of the base portion 22A provides a cradling effect for the neck and shoulders of a vehicle occupant being supported by the headrest assembly 20. The base portion 22A further includes mounting apertures 196B which are used to couple the base portion 22A to the seatback frame 50 (FIG. 3) using fasteners at mounting apertures 196B. Mounting apertures 196A are disposed on the front panel 190 and used to couple the front panel 190 to the rear panel 192 at reciprocal mounting features disposed on rear panel 192, as further described below. The support portion 24A of the front panel 190 includes a generally centrally disposed mounting surface 198 that is generally inset from a frame 199 disposed therearound. In the embodiment shown in FIG. 8A, the mounting surface 198 includes a plurality of mounting apertures 202 disposed therethrough which are configured to receive fasteners 204 therethrough for removeably coupling the headrest bun 26 to the front panel 190. The frame 199 substantially surrounds the mounting surface 198 and includes generally angled sidewalls, through which mounting apertures 206 are disposed and used to couple the front panel 190 to the rear panel 192 in assembly. The outward extension of the frame 199 relative to the inset mounting surface 198 creates a receiving cradle 210. As further described below, the headrest assembly 20 of the present invention is configured to have the headrest bun 26 removeably mounted to the mounting surface 198 of the front panel 190, such that when a vehicle occupant is wearing a helmet, a rear portion of the helmet may be received in the receiving cradle 210 defined by the outwardly extending frame 199 and inset mounting surface 198. The receiving cradle 210 is accessible when the headrest bun 26 has been removed. The mounting surface 198 also serves as a rigid support surface for a rear portion of the helmet of vehicle occupant when the headrest bun 26 has been removed. Mounting and removal of the headrest bun 26 is further described below with specific reference to FIGS. 8A-13D.

With further reference to FIG. 8A, the support member 200 is shown having first and second legs 212, 214 which are interconnected by an upper cross member 216. The support member 200 further includes first and second support wings 220, 222 which are coupled to the first and second legs 212, 214, respectively. The first and second support wings 220, 222 extend outwardly from the first and second legs 212, 214 and are further positioned in a forward direction to match the configuration of the forwardly curved base portion 22A of the front panel 190 to which the first and second support wings 220, 222 are coupled in assembly. The first and second legs 212, 214 further include guide sleeves 224, 226 at ends of the first and second legs 212, 214, wherein the guide sleeves 224, 226 may be integrally formed with the first and second support wings 220, 222, as further described below. The support member 200 further includes attachment features 217A-217C which are used to couple the front and rear panels 190, 192 to the support member 200 in assembly as further described below.

As further shown in FIG. 8A, the rear panel 192 is shown from an inner surface 192B and includes a base portion 22B having first and second forwardly curved arms 230, 232, which further include pass-through holes 234, 236, which may be configured to receive straps for an over-shoulder multi-strap seat harness that may be used in conjunction with the high performance vehicle seat 10 of the present concept. Like the front panel 190, the support portion 24B of the rear panel 192 generally includes a centrally disposed mounting surface 238 having a frame 239 disposed therearound. The mounting surface 238 includes a plurality of mounting apertures 242 disposed therethrough which are configured to receive the fasteners 204 for coupling the mounting surface 238 to the mounting surface 198 of the front panel 190. The first and second arms 230, 232 of the base portion 22B of the rear panel 192 are forwardly curved arms which match the configuration of the first and second support wings 220, 222 of the support member 200, as well as the forwardly curved base portion 22A of the front panel 190.

Referring now to FIG. 8B, rear sides of the headrest bun 26 and the thoracic support cushion 28 are shown, wherein the headrest bun 26 includes a mounting plate 250 disposed on the rear portion thereof. The mounting plate 250 includes mounting apertures 252 which are configured to align with the mounting apertures 202 of the mounting surface 198 of the front panel 190, as well as mounting apertures 242 of the mounting surface 238 of the rear panel 192. When the mounting apertures 252, 202 and 242 of the headrest bun 26, the front panel 190 and the rear panel 192, respectively, are aligned, fasteners 204 are used to couple the headrest bun 26 to the front and rear panels 190, 192. As further shown in FIG. 8B, a plurality of clip members 254 are shown outwardly extending from the thoracic support cushion 28 which are used to couple with the mounting slots 194 disposed on the base portion 22A of the front panel 190. In FIG. 8B, the front panel 190 is shown from a rear or inner surface 190B thereof. Similarly, the rear panel 192 is shown from a rear outer surface 192A thereof. The inner surfaces 190B and 192B of the front and rear panels 190, 192 include a number of coupling features that are used to couple the front and rear panels 190, 192 to one another, as well as to the support member 200. The inner surfaces 190B, 192B of the front and rear panels 190, 192 are further described below with specific reference to FIGS. 10A and 10B.

Figure 9A:
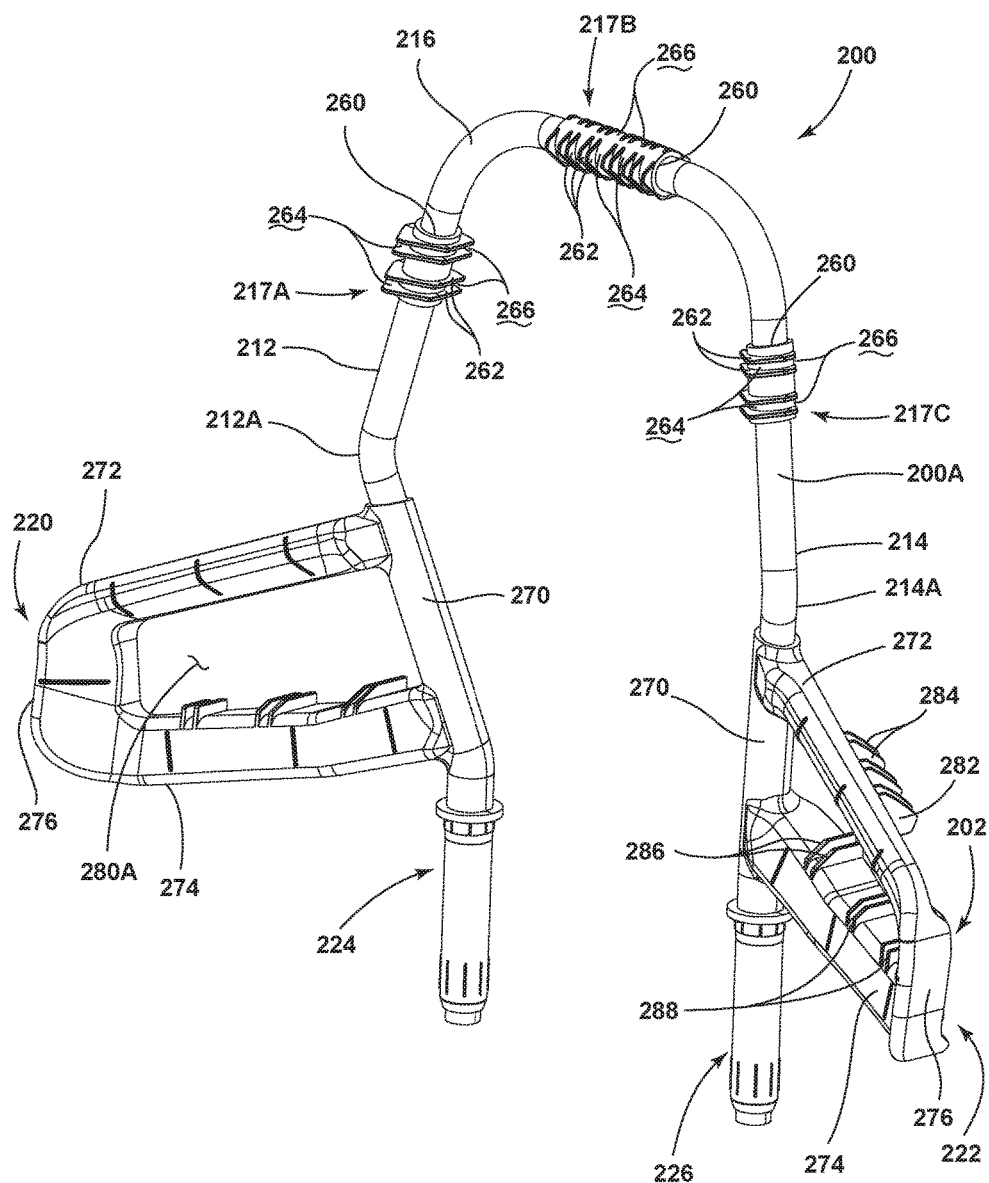
FIG. 9A is a front perspective view of a support member for a headrest assembly.
Figure 9B:
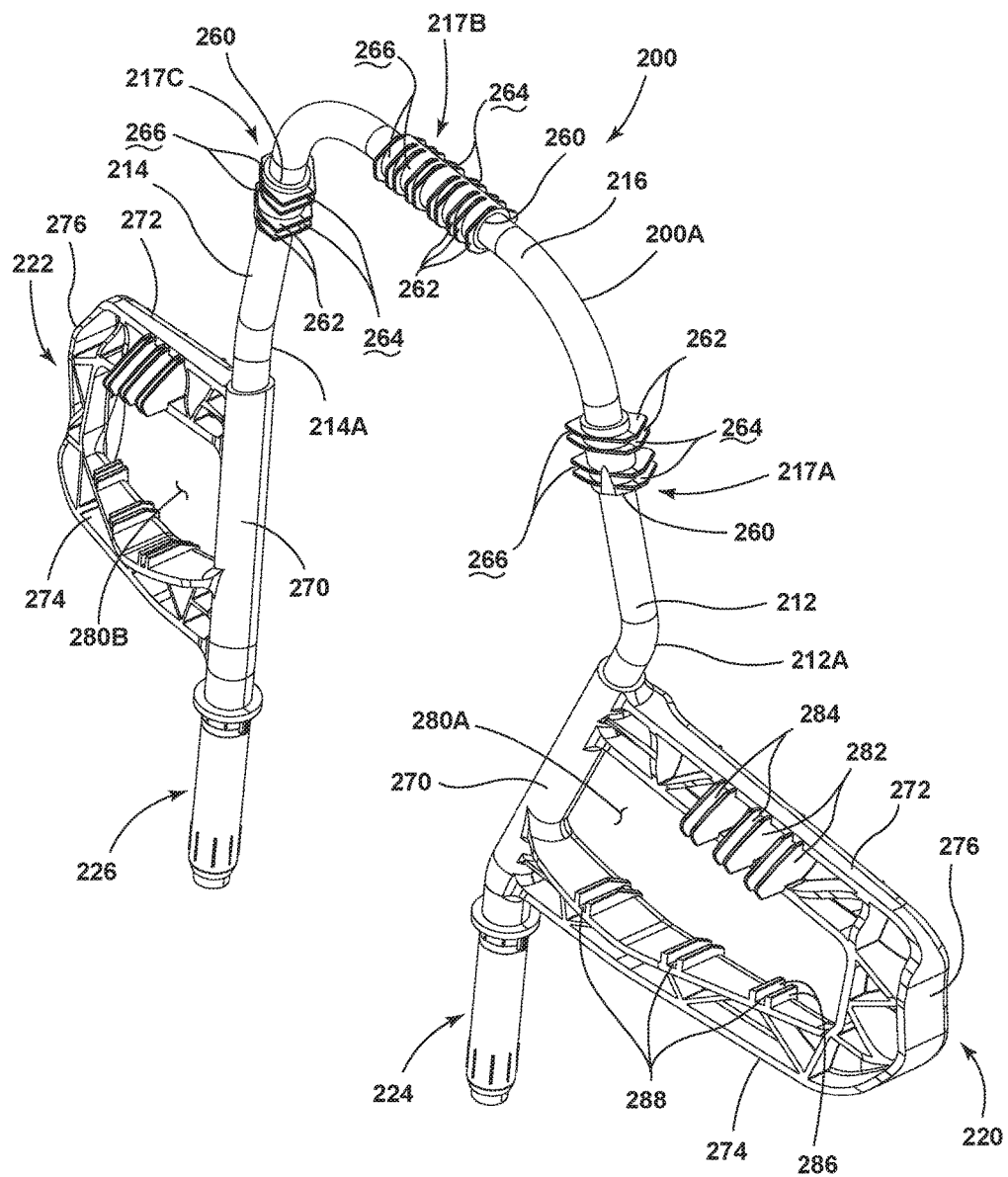
FIG. 9B is a rear perspective view of the support member of FIG. 9A.

Referring now to FIGS. 9A and 9B, the support member 200 of the headrest assembly 20 is shown. As noted above, the support member 200 includes first and second legs 212, 214 which are interconnected by an upper cross member 216, such that the support member 200 has a generally downwardly opening U-shaped configuration. The first and second legs 212, 214 are angled to have outward and forward extending portions 212A, 214A. These outwardly extending and forward portions 212A, 214A of the support member 200 further provide support for the receiving cradle 210 by reinforcing the mounting surfaces 198, 238 and frames 199, 239 of the front and rear panels 190, 192, respectively. As further shown in FIG. 9A, the attachment features 217A-217C include coupling portions 260 which couple the attachment features 217A-217C to the support member 200. In the embodiment shown in FIGS. 9A and 9B, the support member 200 is a generally contemplated to be a rigid metal tubular structure having a rounded outer surface 200A, which may include a 12-13 mm diameter. The coupling portions 260 of the attachment features 217A-217C are contemplated to be plastic composite structures which are overmolded to the armature structure of the support member 200. As used herein, the term "overmolded" and/or "overmolding" refers to a process by which one thermoplastic material is molded over another material(s) to form a unitary part. In an overmolding process of the present concept, a first component (or multiple components) are formed and placed in a mold. After positioning the first component in the mold, a second component is injected into and molded in the mold that already contains the first component. In this way, the first and second components are adhered to each other over at least a portion of a surface of the first component. The overmolding process of the present concept allows for the metal support member 200 and the plastic attachment features 217A-217C to form a unitary hybrid composite structure made of steel and plastic for mounting the front and rear panels 190, 192 thereto. The first and second support wings 220, 222 are also plastic parts which are overmolded to the support member 200 as further described below.

As further shown in FIGS. 9A and 9B, attachment feature 217A is shown disposed on leg 212 of the support member 200, while attachment feature 217C is shown disposed on leg 214 of the support member 200. Attachment feature 217B is shown disposed on the upper cross member 216 of the support member 200. It is contemplated that the attachment features 217A-217C may be coupled to any portion of the support member 200 for providing a loading surface and mounting feature for the front and rear panels 190, 192 in assembly. As noted above, each of the attachment features 217A-217C include a coupling portion 260 which is overmolded to the outer surface 200A to the support member 200. Each of the attachment features 217A-217C further includes a plurality of plates 262 that outwardly extend from the coupling portion 260. The plates 262 are spaced-apart to define the outwardly opening channels 264, 266 therebetween. Specifically, the outwardly opening channels 264 open in a forward direction for receiving support ribs of the inner surface 190B of the front panel 190. Similarly, outwardly opening channels 266 are rearwardly opening channels configured to receive support ribs of the inner surface 192A of the rear panel 192. In this way, the outwardly opening channels 264, 266 defined by the spaced-apart plates 262 of the attachment features 217A-217C provide mounting and locating features for properly positioning and mounting the front and rear panels 190, 192 to the support member 200, such that the support member 200 can provide a rigid frame structure for supporting the front and rear panels 190, 192.

As further shown in FIGS. 9A and 9B, the first and second support wings 220, 222 are shown coupled to and extending outwardly from the first and second legs 212, 214 of the support member 200 and having a forwardly angled pitch. Each of the support wings 220, 222 is coupled to the support member 200 at a coupling portion 270 which is contemplated to be overmolded to the first and second legs 212, 214. Each of these support wings 220, 222 includes an upper arm 272, a lower arm 274, and an end portion 276 inner-connecting the upper and lower arms 272, 274. Together, the upper arm 272, lower arm 274, end portion 276, and coupling portion 270 define pass-through holes 280A, 280B for the first and second support wings 220, 222, respectively. With specific reference to second support wing 222 in FIG. 9A, the second support wing 222 includes a plurality of rearwardly extending plates 282 which are spaced-apart from one another to define a plurality of outwardly opening channels 284, wherein the outwardly opening channels 284 are rearwardly opening in configuration. The lower arm 274 is shown having plates 286 extending upwardly therefrom in a spaced-apart manner along the lower arm 274 to define outwardly opening channels 288. The outwardly opening channels 288 are upwardly opening channels in configuration as positioned on an upper portion of the lower arm 274. This same configuration of plates 282, 286 and channels 284, 288 is shown on the first support wing 220 in FIG. 9B. The channels 284, 288 of the first and second support wings 220, 222 are configured to receive support ribs of the front and rear panels 190, 192, as further described below.

As further shown in FIGS. 9A and 9B, the first and second guide sleeves 224, 226 are integral parts that can be overmolded to end portions of the first and second legs 212, 214, respectively, and are contemplated to be integral parts to the first and second support wing structures 220, 222. In assembly, the guide sleeves 224, 226 are configured to be received in the receiving apertures 62, 64 of the upper cross member 56 of the seatback frame 50 as shown in FIG. 3. In this way, the first and second guide sleeves 224, 226 can support the support member 200 in an upright and upwardly extending manner from the upper cross member 56 of the seatback frame 50.

Figure 10A:
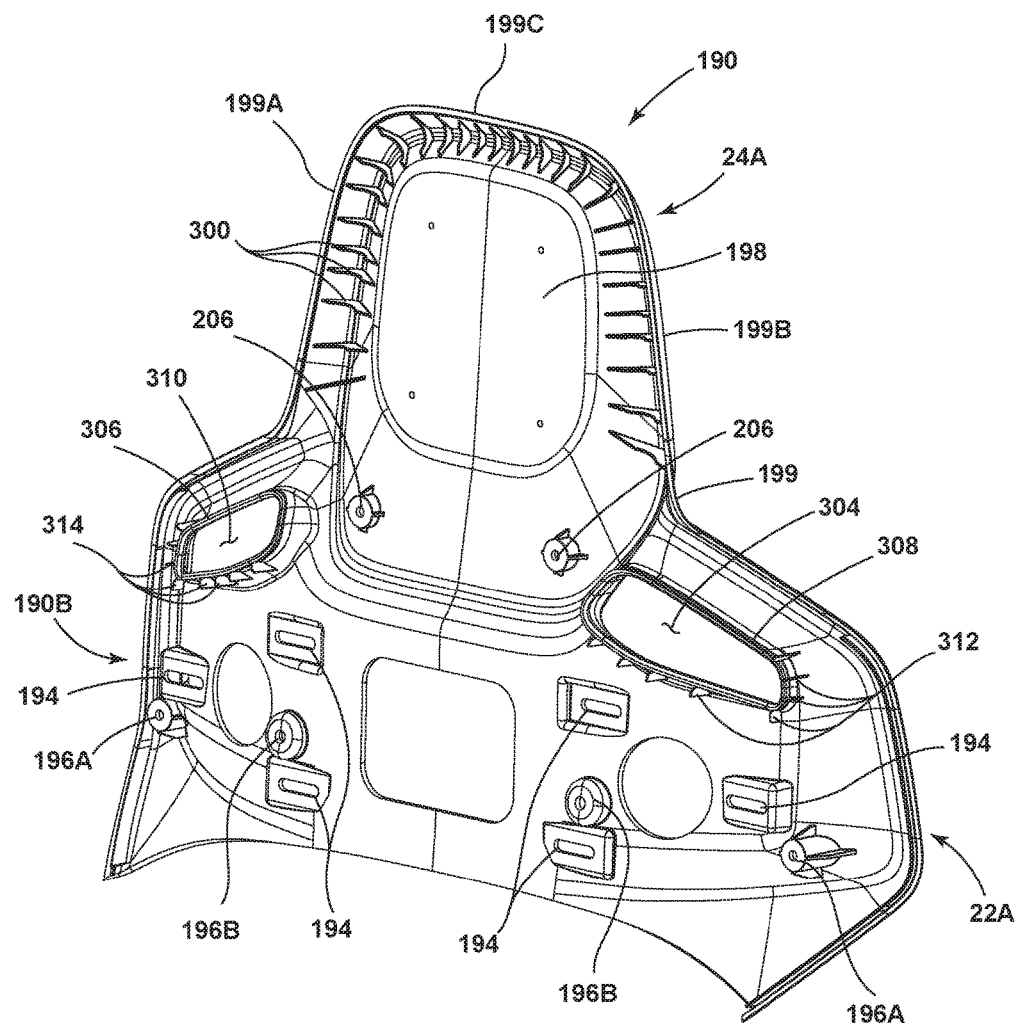
FIG. 10A is a rear perspective view of a front panel for a headrest assembly.
Figure 10B:
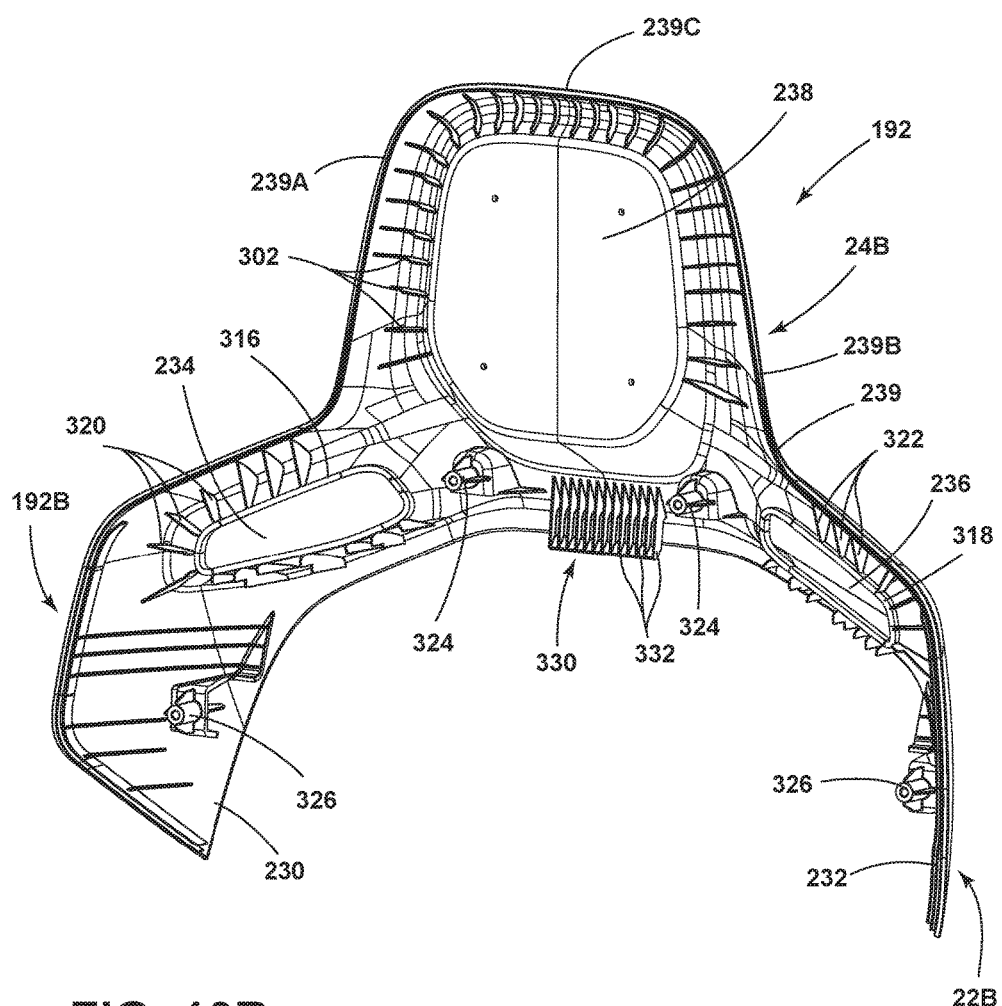
FIG. 10B is a front perspective view of a rear panel for a headrest assembly.

Referring now to FIGS. 10A and 10B, the inner surfaces 190B, 192B of the front and rear panels 190, 192 are shown. With specific reference to FIG. 10A, the inner surface 190B of the front panel 190 is shown having a plurality of spaced-apart support ribs 300 disposed thereon. Specifically, the support ribs 300 are disposed around a periphery of the support portion 24A of the front panel 190. As noted above, the support portion 24A of the front panel 190 is generally defined by an inset mounting surface 198 that is substantially surrounded by an outwardly extending frame 199. In the embodiment shown in FIG. 10A, the frame 199 includes first and second sides 199A, 199B and a top portion 199C inner-connecting the first and second sides 199A, 199B. The support ribs 300 are disposed around the first and second sides 199A, 199B and the top portion 199C to surround outer portions of the mounting surface 198. As disposed around the parameters of the frame 199, the support ribs 300 serve to rigidify the frame 199 and also serve as mating coupling features for the attachment features 217A-217C of the support member 200 best shown in FIGS. 9A, 9B. Specifically, the support ribs 300 of the front panel 190 are configured to be received in the outwardly opening channels 264 of the support member 200 which open in a forward direction on a front side of the support member 200, as best shown in FIG. 9A. With the support ribs 300 disposed on the side portions 199A, 199B and the upper portion 199C of the frame 199, the support ribs 300 can attach to the outwardly opening channels 264 of the attachment features 217A-217C disposed on the first and second legs 212, 214 and the upper cross portion 216 of the support member 200.

With specific reference to FIG. 10B, the inner surface 192B of the rear panel 192 is shown having a plurality of spaced-apart support ribs 302 disposed thereon. Specifically, the support ribs 302 are disposed around a periphery of the support portion 24B of the rear panel 192. As noted above, the support portion 24B of the rear panel 192 is generally defined by a mounting surface 238 substantially surrounded by a frame 239. In the embodiment shown in FIG. 10B, the frame 239 includes first and second sides 239A, 239B and a top portion 239C inner-connecting the first and second sides 239A, 239B. The support ribs 302 are disposed around the first and second sides 239A, 239B and the top portion 239C to surround the outer portions of the mounting surface 298. As disposed around the parameters of the frame 239, the support ribs 302 serve to rigidify the frame 239 and also serve as mating coupling features for the attachment features 217A-217C of the support member 200 best shown in FIGS. 9A, 9B. Specifically, the support ribs 302 of the rear panel 192 are configured to be received in the outwardly opening channels 266 of the support member 200 which open in a rearward direction on a rear side of the support member 200 as best shown in FIG. 9B. With the support ribs 302 disposed on the side portions 239A, 239B and the upper portion 239C of the frame 239, the support ribs 302 of the rear panel 192 can attach to the outwardly opening channels 266 of the attachment features 217A-217C of the support member 200, while the support ribs 300 of the front panel 190 attach to the outwardly opening channels 264 of the attachment features 217A-217C of the support member 200.

With further reference to FIG. 10A, the front panel 190 is shown having first and second pass-through holes 304, 306 having perimeters 308, 310, respectively, disposed therearound. A plurality of support ribs 312, 314 are shown outwardly extending from the perimeters 308, 310 of the first and second pass-through holes 304, 306 of the front panel 190. In assembly, the support ribs 312, 314 are configured to be received in the upwardly opening channels 288 of the first and second support wings 220, 222 as shown in FIGS. 9A and 9B. In this way, the plurality of support ribs 312, 314 disposed around the perimeters 308, 310 of the first and second pass-through holes 304, 306 define support ribs positioned on the base portion 22A of the front panel 190.

Referring again to FIG. 10B, the rear panel 192 is shown having first and second pass-through holes 234, 236 having perimeters 316, 318, respectively, disposed therearound. A plurality of support ribs 320, 322 are shown outwardly extending from the perimeters 316, 318 of the first and second pass-through holes 234, 236 of the rear panel 192. In assembly, the support ribs 320, 322 are configured to be received in the rearwardly opening channels 284 of the first and second support wings 220, 222 as shown in FIGS. 9A and 9B. In this way, the plurality of support ribs 320, 322 disposed around the perimeters 316, 318 of the first and second pass-through holes 234, 236 define support ribs positioned on the base portion 22B of the rear panel 192.

In assembly, the first and second pass-through holes 304, 306 of the front panel 190 (FIG. 10A) are configured to align with the first and second pass-through holes 234, 236 of the rear panel 192 (FIG. 10B). The first and second pass-through holes 304, 306 and 234, 236 of the front and rear panels 190, 192 are further configured to align with the pass-through holes of the 280A, 280B of the support member 200 (FIG. 9A). Thus, the vehicle seat assembly 10 (FIG. 1) includes first and second pass-through holes disposed on the base portion 22 of the headrest assembly 20 as shown in FIG. 1 when the component parts of the headrest assembly 20 are coupled together. The pass-through holes are configured to provide a passage way for a multi-point harness having over-the-shoulder restraining straps passing thru the first and second pass-through holes.

The front panel 190 is configured to couple to the rear panel 192 at mounting apertures 206 of the front panel 190 which are configured to align with mounting bosses 324 of the rear panel 192. Further, the mounting apertures 196A of the front panel 190 disposed on the base portion 22A thereof are configured to couple to mounting bosses 326 of the rear panel 192 which are disposed on the first and second arms 230, 232 which define the base portion 22B of the rear panel 192. The above noted couplings can be made using fasteners extending though the mounting apertures 206, 196A of the front panel 190 that are received in and coupled to the mounting bosses 324, 326 of the rear panel 192. Further, the above noted couplings can be made using a hot melt technique, or using an adhesive to adhere the mounting bosses 324, 326 of the rear panel 192 to the mounting apertures 206, 196A of the front panel 190. In this way, the front and rear panels 190, 192 couple to the support member 200, and further couple to one another at mounting apertures 206, 196A and mounting bosses 324, 326. The coupling of the front and rear panels 190, 192 with the attachment features 217A-217C of the support member 200 at support ribs 300, 314, 312, 302, 320, 322 of the front and rear panels 190, 192 is contemplated to be retained using a hot melt technique or an adhesive to adhere the front and rear panels 190, 192 to the attachment features 217A-217C of the support member 200. As noted above, the front panel 190 also couples to the seatback frame 50 at mounting apertures 196B. As shown in FIG. 10B, the rear panel 192 includes a mounting structure 330 defined by a plurality of spaced-apart ribs 332 to form a downwardly hook-shaped configuration which is configured to be received in the mounting aperture 57 disposed on the upper portion 56A of the seatback frame 50 as shown in FIG. 4B. This interconnection of the front and rear panels 190, 192, the support member 200, and the seatback frame 50 provides for a rigid and supporting configuration for the headrest assembly 20 in assembly as shown in the vehicle seat assembly 10 of FIGS. 1 and 2.

Figure 11A:
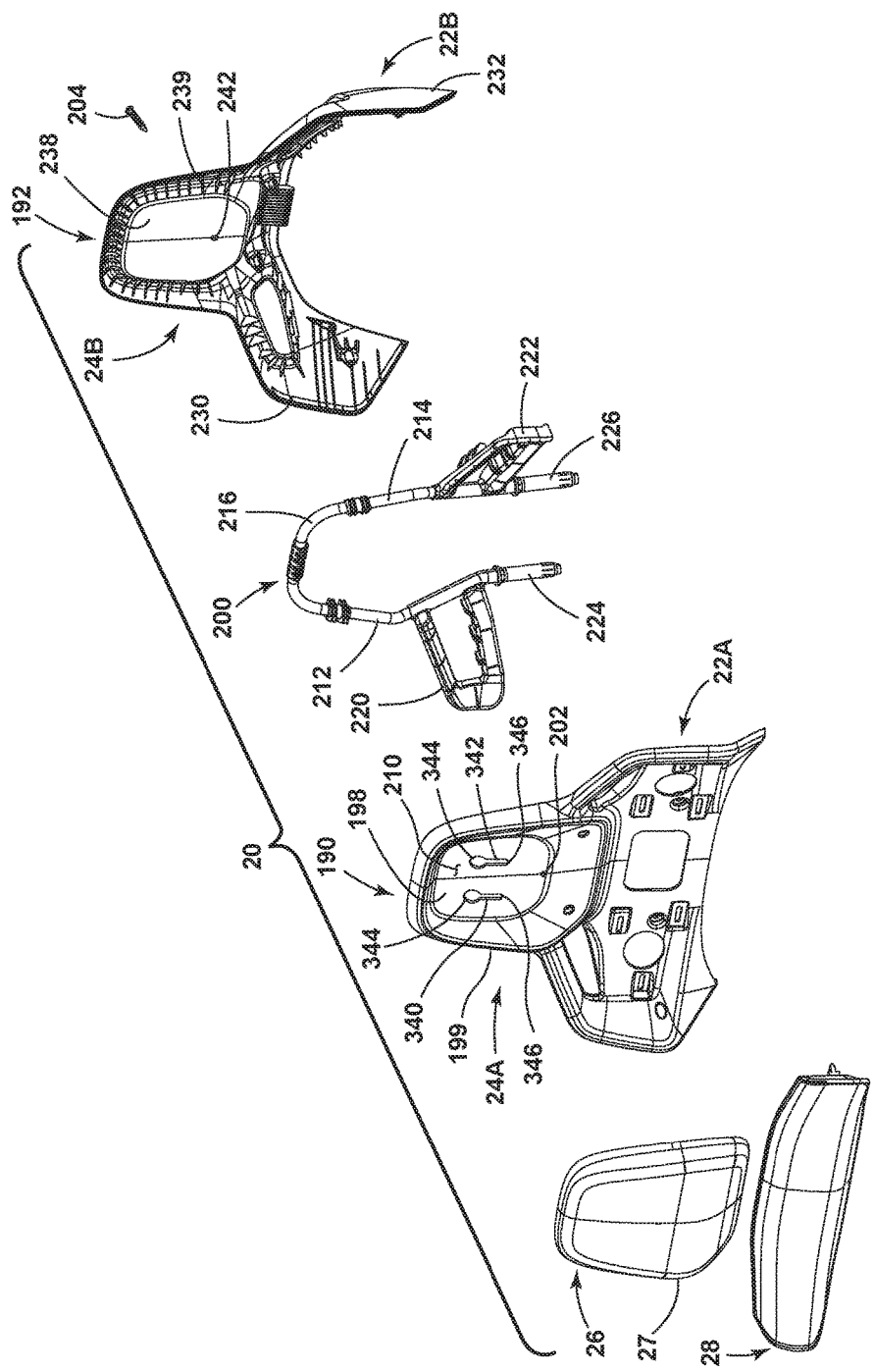
FIG. 11A is an exploded front perspective view of a headrest assembly according to another embodiment.

Referring now to FIG. 11A, a headrest assembly 20 is shown similar to the headrest 20 shown in FIG. 8A. The headrest assembly 20 of FIG. 11A includes a number of engagement features for providing a headrest bun coupling system that allows for an end user to easily mount and remove the headrest bun 26 therefrom. Specifically, as shown in FIG. 11A, the rear panel 192 includes a mounting surface 238 having a single mounting aperture 242 disposed therethrough. It is contemplated that multiple mounting apertures 242 may be used with the present concept, however, the embodiment shown in FIG. 11A will be described with a single mounting aperture 242 disposed in the mounting surface 238 of the rear panel 192. Mounting aperture 242 of the rear panel 192 is configured to align with a mounting aperture 202 of the front panel 190. Mounting aperture 202 of the front panel 190 is also disposed on a mounting surface 198 of the front panel 190. The mounting apertures 242 and 202 are generally centrally located at lower portions of the mounting surfaces 238, 198 of the rear and front panels 192, 190, respectively. As aligned with one another, the mounting apertures 242, 202 are configured to receive a retaining fastener 204 for retaining the headrest bun 26 on the mounting surface 198 of the front panel 190, as further described below.

As further shown in FIG. 11A, the mounting surface 198 of the front panel 190 includes first and second receiving slots 340, 342 disposed therethrough. The first and second receiving slots 340, 342 each include first and second ends 344, 346. As shown in FIG. 11A, the first ends 344 are larger than the second ends 346, such that the first and second receiving slots 340, 342 generally define keyhole slots. As noted above, the mounting surface 198 of the front panel 190 is surrounded by an outwardly extending frame 199 to define a receiving cradle 210. The first and second receiving slots 340, 342 are disposed through the mounting surface 198 for releasably coupling the headrest bun 26 to the front panel 190, such that the headrest bun 26 can be releasably received in the cradle 210. As noted above, the headrest bun 26 is configured to be removed from the front panel 190 in order to provide access to the receiving cradle 210 which is configured to receive a rear portion of a helmet worn by a vehicle occupant when the vehicle seat 10 (FIG. 1) is used in a high-performance vehicle in particular conditions, wherein a vehicle occupant is required to, or chooses to, wear a helmet. In this way, the vehicle seat 10 is configurable between a comfort setting having the headrest bun 26 coupled to the front panel 190 as shown in FIG. 1, and is also configurable to meet race-day conditions, wherein the headrest bun 26 is removed to provide access to the receiving cradle 210.

Figure 11B:
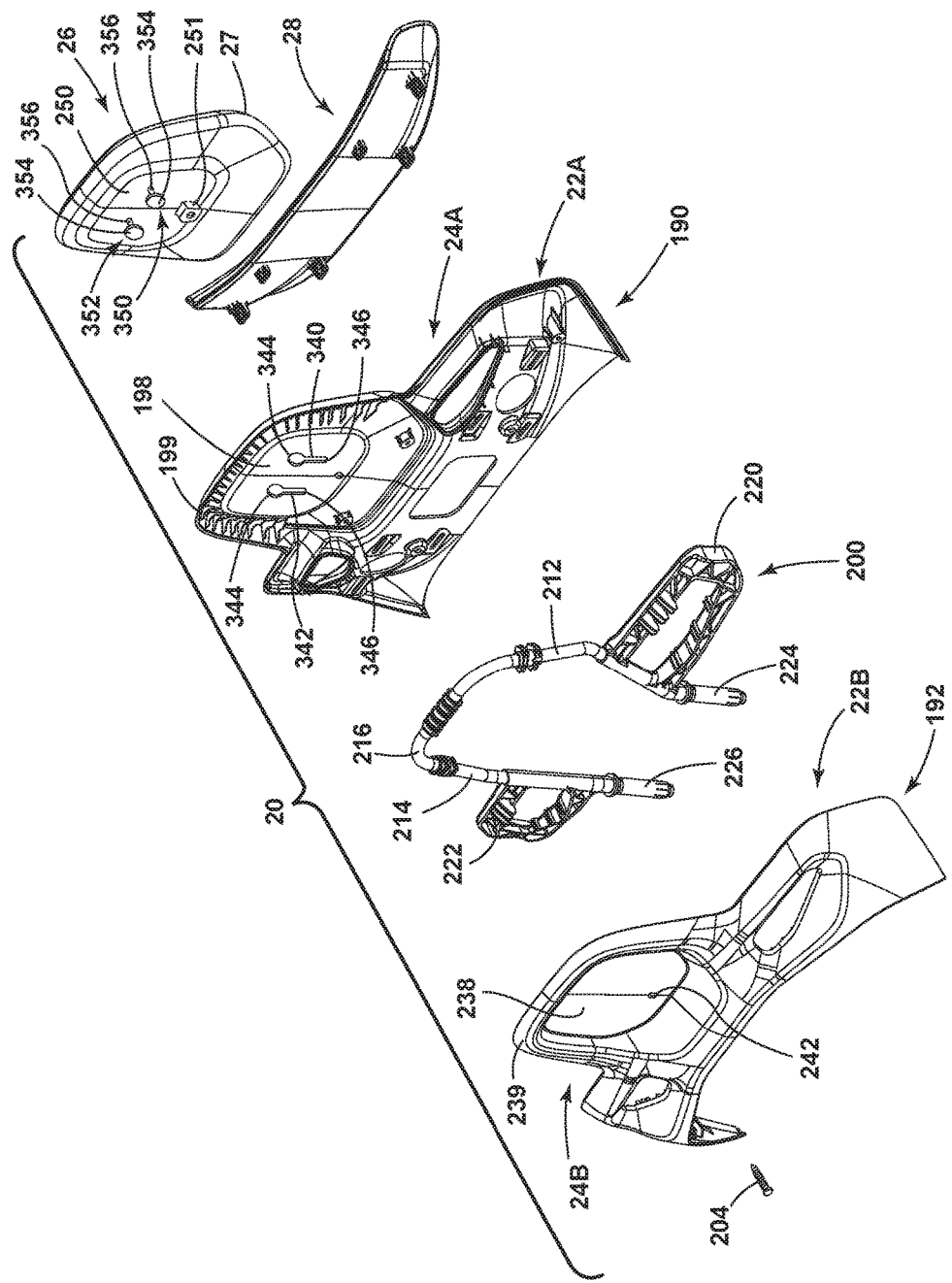
FIG. 11B is an exploded rear perspective view of the headrest assembly of FIG. 11A.

Referring now to FIG. 11B, the headrest bun 26 is shown having the mounting plate 250 disposed on a rear portion thereof. In the embodiment shown in FIG. 11B, the mounting plate 250 includes first and second fastener members 350, 352 which are spaced-apart to align with the spaced-apart first and second receiving slots 340, 342 of the front panel 190. The first and second fastener members 350, 352 each include a head portion 354 and a shaft portion 356. As shown in FIG. 11B, the head portions 354 have a first width, while the shaft portions 356 have second width. The first width of the head portions 354 is larger than the second width of the shaft portions 356. Given the above noted configuration of the first and second fastener members 350, 352, the first and second fastener members 350, 352 are configured to be received in and retained in the first and second receiving slots 340, 342 of the front panel 190. In order to couple the fastener members 350, 352 to the receiving slots 340, 342, the head portions 354 of the first and second fastener members 350, 352 are received through the larger first ends 344 of the receiving slots 340, 342. In the embodiment shown in FIGS. 11A and 11B, the first and second receiving slots 340, 342 are vertically disposed, such that the headrest bun 26 is moved downward after the head portions 354, of the first and second fastener members 350, 352 are received through the larger first ends 344 of the first and second receiving slots 340, 342. As the headrest bun 26 moves downward along the first and second receiving slots 340, 342, the shaft portions 356 of the first and second fastener members 350, 352 are received in the second end 346 of the first and second receiving slots 340, 342. The width of the head portions 354 of the first and second fastener members 350, 352 is generally larger than the width of the second ends 346 of the first and second receiving slots 340, 342, such that the head portions 354 of the first and second fastener members 350, 352 are retained within the first and second receiving slots 340, 342 at the second ends 346 thereof.

As further shown in FIG. 11B, the mounting plate 250 of the headrest bun 26 includes an outwardly extending mounting boss 251 which is configured to align with the mounting apertures 202, 242 of the front and rear panels 190, 192, respectively. In this way, the retaining fastener 204 can be received through the mounting apertures 202, 242 of the front and rear panels 190, 192 and couple to the mounting boss 251 extending rearwardly from the mounting plate 250 of the headrest bun 26. In this way, the retaining fastener 204 retains the headrest bun 26 from vertical movement along the retaining slots 340, 342. As noted above, the releasability of the headrest bun 26 provides access to the receiving cradle 210 of the front panel 190 for the receiving of a rear portion of a helmet worn by a vehicle occupant. The mounting surface 198 of the front panel 190 is an inset mounting surface, as the frame 199 is an outwardly extending frame that substantially surrounds the mounting surface 198. In this way, the mounting surface 198 and the frame 199 cooperate to define the receiving cradle 210. As shown in FIGS. 11A and 11B, the headrest bun 26 includes a front cushioned member 27 which outwardly extends from the mounting plate 250. The size and outward extension of the cushioned member 27 would create an uncomfortable position for a vehicle occupant seated in the vehicle seat 10 when the vehicle occupant is wearing a helmet. As such, with the headrest bun 26 removed from the front panel 190, the receiving cradle 210 is configured to receive a rear portion of a helmet worn by a vehicle occupant that generally occupies a similar amount of space previously occupied by the headrest bun 26. In this way, a vehicle occupant can have a similar position when seated in the vehicle seat 10 with the headrest bun 26 in place, or with the headrest bun 26 removed therefrom when the vehicle occupant is wearing a helmet.

Figure 12A:
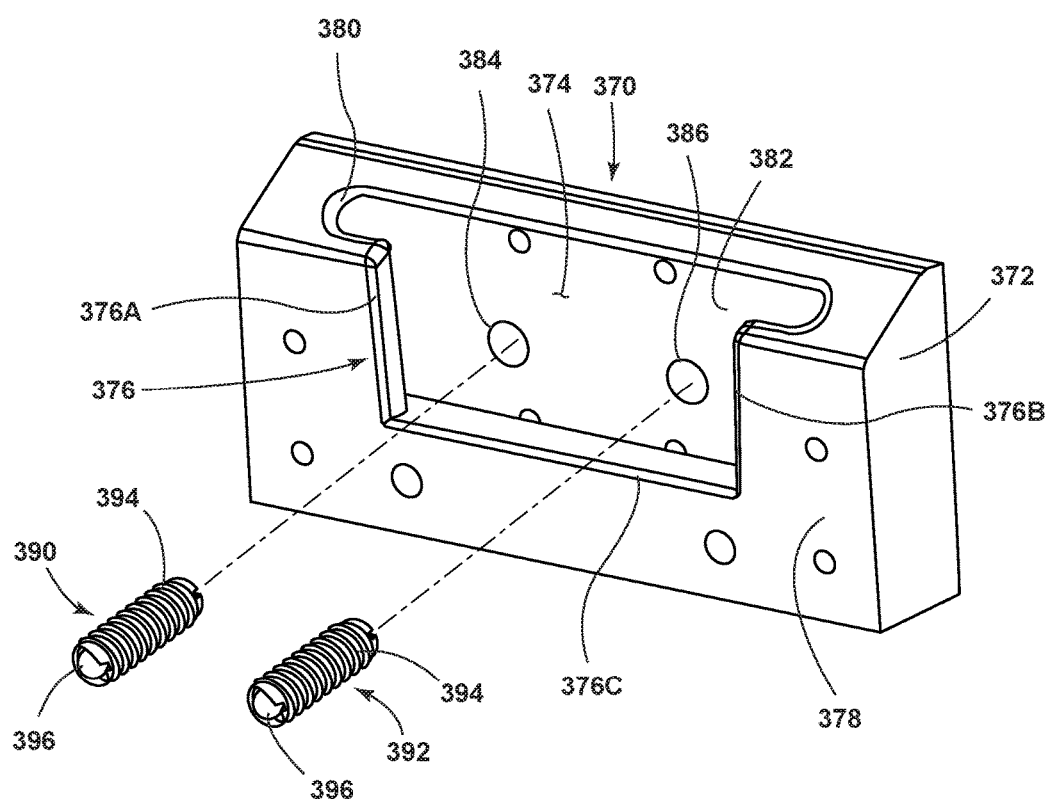
FIG. 12A is a front perspective view of a receiving block having detent engagement features exploded away therefrom.

Referring now to FIG. 12A, a receiving block 370 is shown, wherein the receiving block 370 includes a body portion 372 having a receiving slot 374 disposed therein. The receiving slot 374 includes an open first end 376 disposed on a front surface 378 of the body portion 372 of the receiving block 370. The receiving slot 374 further includes a second end 380 which is wider than the first end 376 for retaining an interlock member, as further described below. The second end 380 of the receiving slot 374 includes a front surface 382 having first and second receiving apertures 384, 386 disposed therein. The first and second receiving apertures 384, 386 are configured to receive first and second detent engagement features 390, 392. Each of the detent engagement features 390, 392 includes a body portion 394 having a retractable engagement member 396 extending outwardly therefrom. The retractable engagement member 396 is contemplated to be biased toward an outwardly extending position as shown in FIG. 12A and retractable against a biasing mechanism disposed within the body portion 394 for allowing the insertion and removal of an interlock member, as further described below.

Figure 12B:
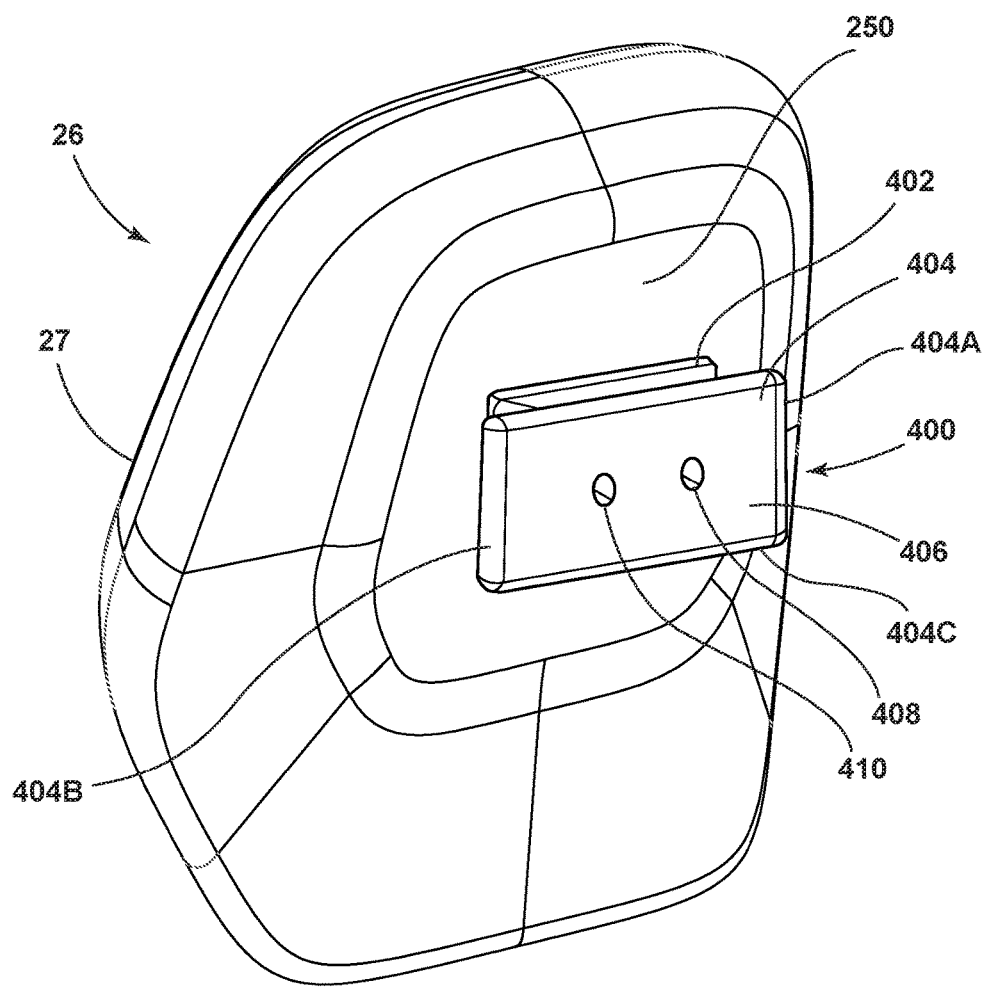
FIG. 12B is a rear perspective view of a headrest bun having a mounting surface with an interlock member extending outwardly therefrom.

Referring now to FIG. 12B, the headrest bun 26 is shown having an interlock member 400 extending outwardly from the mounting plate 250 of the headrest bun 26. The interlock member 400 includes a base portion 402 and a plate portion 404, wherein the base portion 402 has a width that is less than the width of the plate portion 404. As configured in the manner illustrated in FIG. 12B, the interlock member 400 is configured to be received in the receiving slot 374 of the receiving block 370 shown in FIG. 12A. Specifically, the plate member 404 is configured to be disposed and retained in the second end 380 of the receiving slot 374, while the base portion 402 of the interlock member 400 is configured to be received in the first end 376 of the receiving slot 374. In this way, first and second sides 376A, 376B of the first end 376 of the receiving slot 374 are configured to retain first and second sides 404A, 404B of the plate portion 404 of the interlock member 400 when the interlock member 400 is received in the receiving slot 374. Further, a lower end 404C of the plate portion 404 of the interlock member 400 is retained by a lower wall 376C of the first end 376 of the receiving slot 374, wherein the lower end 376C interconnects the first and second sides 376A and 376B as shown in FIG. 12A.

The interlock member 400 further includes an outer surface 406 having first and second inset detent features 408, 410. The first and second inset detent features 408, 410 are generally provided as dimples which inwardly extend into the plate portion 404 of the interlock member 400. The inset detent features 408, 410 may include a variety of configurations that are properly suited to receive the retractable engagement members 396 of the first and second detent engagement features 390, 392 of the receiving block 370.

Figure 12C:
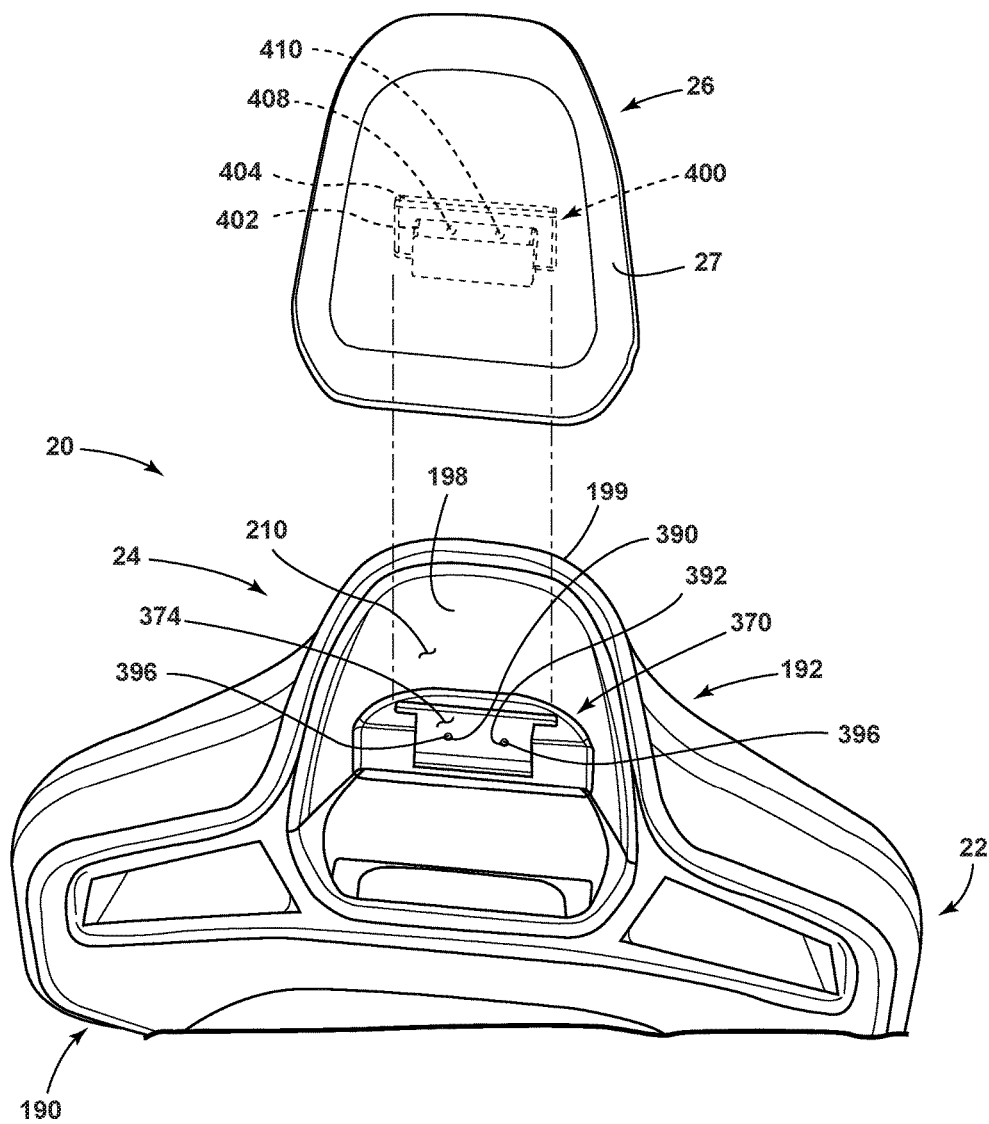
FIG. 12C is a front perspective view of a headrest assembly according to another embodiment having the receiving block of FIG. 12A and the headrest bun of FIG. 12B exploded away therefrom.

Referring now to FIG. 12C, the front panel 190 is shown coupled to the rear panel 192 to define the base portion 22 and support portion 24 of the headrest assembly 20. The receiving block 370 is shown received on the mounting surface 198 of the front panel 190, wherein the mounting surface 198 is an inset mounting surface due to the outwardly extending frame 199 surrounding the mounting surface 198 to define the receiving cradle 210. The headrest bun 26 is shown exploded away from the support portion 24 with the interlock member 400 shown in phantom on a rear surface of the headrest bun 26. The interlock member 400 is shown aligned with the receiving slot 374 of the receiving block 370 to be received therein. The detent engagement features 390, 392 of the receiving block 370 are further shown aligned with the detent receiving features 408, 410 of the interlock member 400, such that the retractable engagement members 396 of the first and second of the retractable detent engagement features 390, 392 may be received in the inset detent features 408, 410, respectively.

Figure 12D:
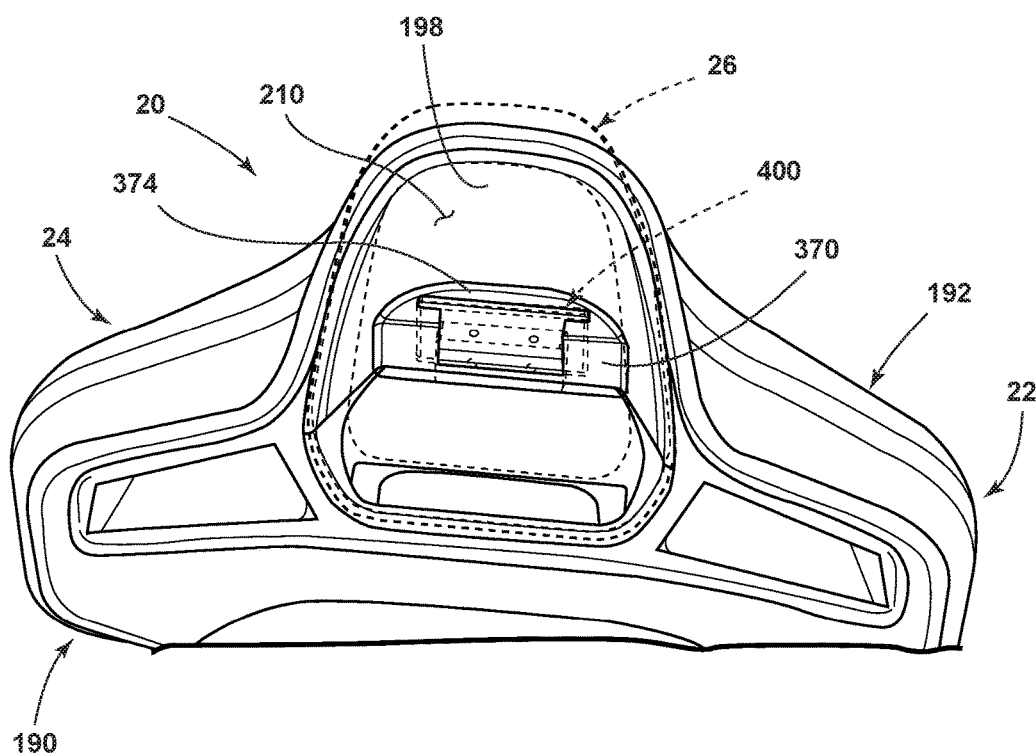
FIG. 12D is a front perspective view of the headrest assembly of FIG. 12C showing the headrest bun coupled thereto in phantom of FIG. 12B.

Referring now to FIG. 12D, the headrest bun 26 is shown received in the receiving cradle 210 and coupled to the mounting surface 190 by an interconnection of the interlock member 400 and receiving slot 374 and receiving block 370. In this configuration, the retractable detent engagement features 390, 392 are configured to have the engagement members 396 received in the inset detent features 408, 410 of the interlock member 400. Having a ball-shaped configuration, the engagement members 396 are configured to be plunged inwardly into the body portions 394 (FIG. 12A) when connected by the plate portion 404 of the interlock member 400, and again extend to the extended position, as biased thereto, when the engagement members 396 align with the inset detent features 408, 410 of the interlock member 400. This engagement of the engagement members 396 and the inset detent features 408, 410 retains the headrest assembly 26 against upward vertical movement. It is further contemplated that the headrest assembly 20 shown in FIG. 12D may also include a retaining fastener, such as retaining fastener 204 shown in FIGS. 11A and 11B, to further restrict vertical movement of the headrest bun 26 as received in the receiving cradle 210.

Referring now to FIG. 13A, another embodiment of a headrest assembly 418 is shown, wherein front and rear panels 420, 422 are configured to be coupled to support member 200 as well as coupled to one another. The support member 200 is contemplated to have a similar configuration to the support member 200 as shown in FIGS. 11A and 11B. The front and rear panels 420, 422 include configurations which generally follow the parameters of the support member 200, such that the front and rear panels 420, 422 generally cooperate to define first and second sides 424, 426 which are interconnected by an upper portion 428. The first and second sides 424, 426 and upper portion 428 cooperate to define a receiving cradle 430 configured to receive a rear portion of a helmet worn by a vehicle occupant. The receiving cradle 430 includes a web member 432 disposed therein having three legs 434, 436, and 438 which interconnect to the first and second sides 424, 426 and the upper portion 428, respectively. Each leg 434, 436, and 438 includes a receiving aperture 440 disposed therethrough for receiving fasteners for coupling to a headrest assembly 450, as shown in FIG. 13B.

Referring now to FIG. 13B, the headrest assembly 450 is shown having a mounting plate 452 disposed on a rear portion and a front cushioned member 454. The mounting plate 452 includes a plurality of outwardly extending mounting bosses 454 which are configured to align with the mounting apertures 440 of the web member 432. In this way, fasteners passing through the receiving apertures 440 of the web member 432 can couple to the outwardly extending mounting bosses 454 of the headrest assembly 450 for coupling the headrest assembly 450 to the web member 432 in a releasable manner.

Figure 13D:
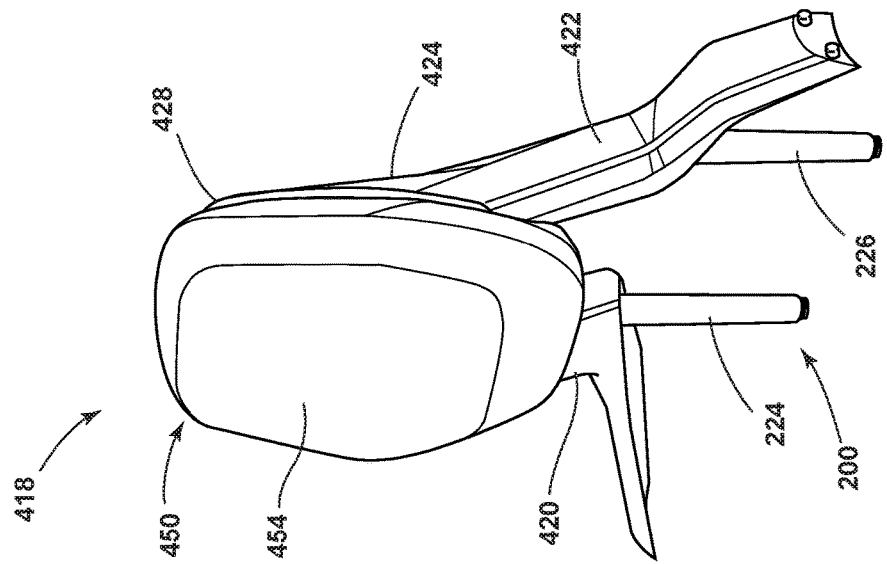
FIG. 13D is a front perspective view of the headrest assembly of FIG. 13C.
Figure 13C:
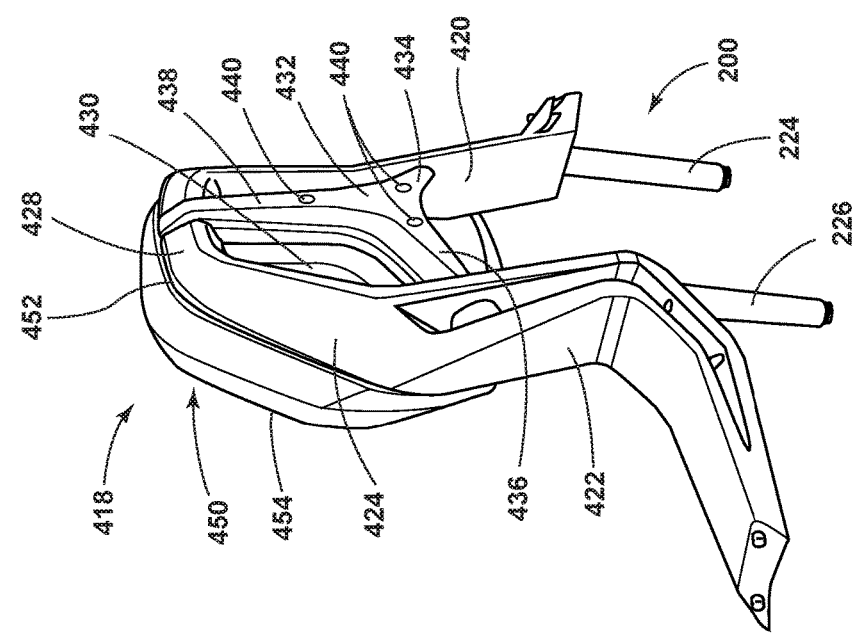
FIG. 13C is a rear perspective view of the headrest assembly of FIG. 13B with the headrest bun coupled thereto.

In the embodiment shown in FIGS. 13C and 13D, the headrest assembly 450 is shown mounted to the web member 432 in a removable manner via fasteners contemplated to be inset within receiving apertures 440.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

We claim:

1. A headrest assembly for a vehicle seat, comprising:
a front panel having a base portion and a support portion;
a rear panel having a base portion and a support portion;
a support member having first and second legs interconnected by an upper cross member; and
first and second support wings having coupling portions overmolded to the first and second legs and outwardly extending therefrom, wherein the base portion of the front panel couples to a front side of the first and second support wings, and further wherein the base portion of the rear panel couples to a rear side of the first and second support wings.

2. The headrest assembly of claim 1, wherein the first and second support wings include a plurality of upwardly opening channels disposed thereon.

3. The headrest assembly of claim 2, wherein the base portion of the front panel includes a plurality of support ribs, and further wherein one or more of the support ribs of the plurality of support ribs of the front panel is received in one or more of the upwardly opening channels of the plurality of upwardly opening channels disposed on the first and second support wings.

4. The headrest assembly of claim 3, wherein the first and second support wings include a plurality of rearwardly opening channels disposed thereon.

5. The headrest assembly of claim 4, wherein the base portion of the rear panel includes a plurality of support ribs, and further wherein one or more of the support ribs of the plurality of support ribs of the rear panel is received in one or more of the rearwardly opening channels of the plurality of rearwardly opening channels disposed on the first and second support wings.

6. The headrest assembly of claim 1, including:
an attachment feature having a coupling portion overmolded to the support member, the attachment feature including a plurality of outwardly opening channels.

7. The headrest assembly of claim 6, wherein the support portion of the front panel includes a plurality of support ribs, and further wherein one or more of the support ribs of the plurality of support ribs of the support portion of the front panel is received in one or more of the outwardly opening channels of the plurality of outwardly opening channels disposed on the attachment feature.

8. The headrest assembly of claim 7, wherein the support portion of the rear panel includes a plurality of support ribs, and further wherein one or more of the support ribs of the plurality of support ribs of the support portion of the rear panel is received in one or more of the outwardly opening channels of the plurality of outwardly opening channels disposed on the attachment feature.

9. The headrest assembly of claim 8, wherein the plurality of outwardly opening channels of the attachment feature includes forwardly opening channels and rearwardly opening channels, and further wherein one or more of the support ribs of the plurality of support ribs of the support portion of the rear panel is received in the rearwardly opening channels, and further wherein one or more of the support ribs of the plurality of support ribs of the support portion of the front panel is received in the forwardly opening channels.

10. The headrest assembly of claim 1, wherein the coupling portions of the first and second support wings include first and second guide sleeves extending downwardly therefrom.

11. A headrest assembly, comprising:
a support member having first and second support wings outwardly extending from opposite sides of the support member, wherein the first and second support wings include coupling portions overmolded to first and second legs of the support member, and further wherein the first and second support wings each include upper and lower arms interconnected by an end portion, wherein a pass-through hole is defined between the upper and lower arms;
a front panel having a base portion coupled to the first and second support wings; and
a rear panel having a base portion coupled to the first and second support wings, wherein the rear panel is further coupled to the front panel around the support member.

12. The headrest assembly of claim 11, wherein the lower arms of the first and second support wings include a plurality of channels disposed thereon, and further wherein the upper arms of the first and second support wings include a plurality of channels disposed thereon.

13. The headrest assembly of claim 12, wherein the base portion of the front panel includes a plurality of support ribs, and further wherein one or more of the support ribs of the plurality of support ribs of the front panel is received in one or more of the channels of the plurality of channels disposed on the lower arms of the first and second support wings.

14. The headrest assembly of claim 13, wherein the base portion of the rear panel includes a plurality of support ribs, and further wherein one or more of the support ribs of the plurality of support ribs of the rear panel is received in one or more of the channels of the plurality of channels disposed on the upper arms of the first and second support wings.

15. A headrest assembly, comprising:
a support member;
first and second support wings outwardly extending from opposite sides of the support member, the first and second support wings included a plurality of channels disposed thereon;
a front panel having a base portion, wherein the base portion of the front panel includes a plurality of support ribs, one or more of the support ribs of the front panel received in one or more of the channels disposed on the first and second support wings; and
a rear panel having a base portion, wherein the base portion of the rear panel includes a plurality of support ribs, one or more of the support ribs of the rear panel received in one or more of the channels disposed on the first and second support wings.

16. The headrest assembly of claim 15, including:
one or more attachment features having coupling portions overmolded to the support member, each of the one or more attachment features including a plurality of outwardly opening channels.

17. The headrest assembly of claim 16, wherein the front and rear panels include support portions disposed over the base portions, the support portions of the front and rear panels having support ribs extending outwardly therefrom, wherein one or more of the support ribs of the front and rear panels are received in one or more channels of the plurality of outwardly opening channels of the one or more attachment features.

\* \* \* \* \*